United States Patent
Kato et al.

(10) Patent No.: US 9,300,820 B2
(45) Date of Patent: Mar. 29, 2016

(54) INFORMATION PROCESSING APPARATUS, INFORMATION PROCESSING METHOD, AND STORAGE MEDIUM

(75) Inventors: Hisashi Kato, New York, NY (US); Koichi Abe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 12/829,186

(22) Filed: Jul. 1, 2010

(65) Prior Publication Data

US 2011/0004705 A1    Jan. 6, 2011

(30) Foreign Application Priority Data

Jul. 3, 2009    (JP) ................. 2009-158939

(51) Int. Cl.
 *G06F 3/00* (2006.01)
 *H04N 1/00* (2006.01)
 *G06F 3/12* (2006.01)

(52) U.S. Cl.
 CPC .......... *H04N 1/00222* (2013.01); *G06F 3/1204* (2013.01); *G06F 3/126* (2013.01); *H04N 2201/0074* (2013.01); *H04N 2201/0094* (2013.01)

(58) Field of Classification Search
 None
 See application file for complete search history.

(56) References Cited

U.S. PATENT DOCUMENTS

| | | | |
|---|---|---|---|
| 6,801,507 B1 | 10/2004 | Humpleman | |
| 8,208,152 B2 * | 6/2012 | Hanson et al. | 358/1.15 |
| 2005/0280858 A1 | 12/2005 | Kim | |
| 2008/0204798 A1 * | 8/2008 | Taniguchi et al. | 358/1.15 |
| 2008/0231898 A1 * | 9/2008 | Iwanaga et al. | 358/1.15 |
| 2009/0300659 A1 * | 12/2009 | Asai | 719/321 |

FOREIGN PATENT DOCUMENTS

| | | |
|---|---|---|
| JP | 2005-085132 A | 3/2005 |
| JP | 2010-244453 A | 10/2010 |
| KR | 10-2006-0113787 A | 11/2006 |
| WO | 2007/074537 A1 | 7/2007 |

* cited by examiner

*Primary Examiner* — Henry Tsai
*Assistant Examiner* — Juanito Borromeo
(74) *Attorney, Agent, or Firm* — Canon USA, Inc. IP Division

(57) ABSTRACT

When an application is launched, it is determined whether a launching source is a device management. If it is determined that the launching source is the device management, a peripheral apparatus associated with the device management serving as the launching source is controlled as a default peripheral apparatus.

12 Claims, 20 Drawing Sheets

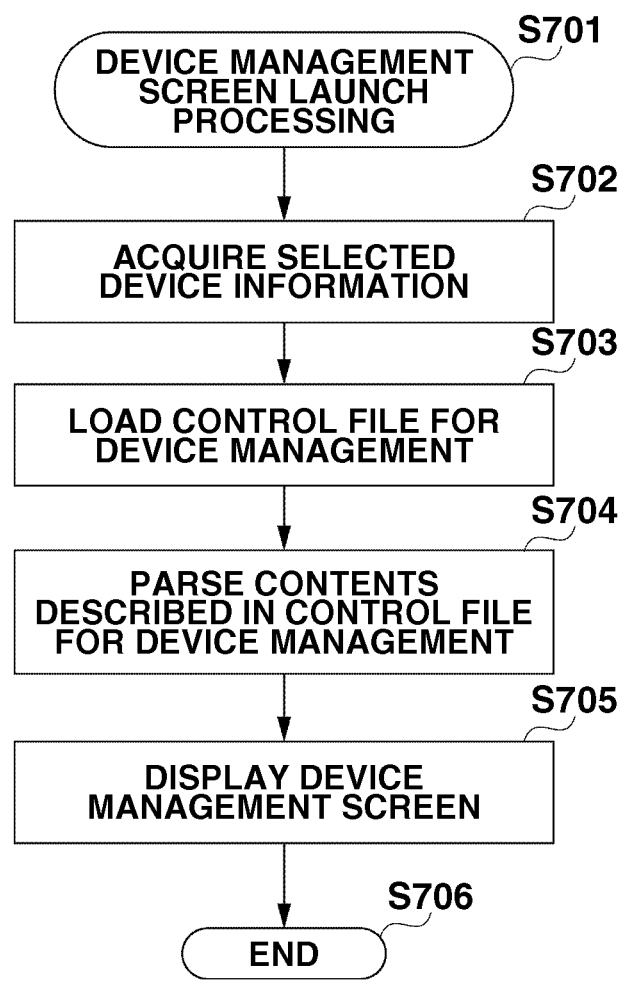

FIG.8

```xml
<?xml version="1.0"encoding="utf-8"?>
<dm:deviceManagement xmlns:dm="http://abc.xxx/dm/control">
    <dm:manufacturer>ABC</dm:manufacturer>   ~801
    <dm:model>Kmmn</dm:model>   ~802
    <dm:functions>   ~803
        <dm:function>   ~804
            <dm:namexml:lang="en-US">Open Printer Queue</dm:name>   ~805
            <dm:execute>openPrinterQueue</dm:execute>   ~806
        </dm:function>
        <dm:function>
            <dm:name xml:lang="en-US">Printing Preferences</dm:name>   ~807
            <dm:execute>printingPreferences</dm:execute>   ~808
        </dm:function>
        <dm:function>
            <dm:name xml:lang="en-US">Show Ink Level</dm:name>   ~809
            <dm:execute>   ~810
                rundll32 StatusMonitor.dll,FunctionEntry DeviceFriendlyName;1;100
            </dm:execute>
        </dm:function>
        <dm:function>
            <dm:name xml:lang="en-US">Show Device Status</dm:name>   ~811
            <dm:execute>   ~812
                rundll32 StatusMonitor.dll,FunctionEntry DeviceFriendlyName;2;100
            </dm:execute>
        </dm:function>
        <dm:function>
            <dm:name xml:lang="en-US">Launch Application A</dm:name>   ~813
            <dm:execute>%ProgramFiles%¥ABC¥ApplicationA.exe /devmng /devname</dm:execute>   ~814
        </dm:function>
    </dm:functions>
</dm:deviceManagement>
```

800

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus that can communicate with a peripheral apparatus.

2. Description of the Related Art

A peripheral apparatus control system enables a user of a personal computer (hereinafter, referred to as "PC") to access a peripheral apparatus via an appropriate interface, such as USB, Ethernet, or wireless LAN. This kind of control system can be effectively used for various users in their houses and offices. An example of the peripheral apparatus is, for example, a printer, a copying machine, a facsimile machine, a scanner, a digital camera, or a multifunction peripheral.

Windows 7 (product name), which is provided by Microsoft Corporation, includes newly introduced functions to manage peripheral apparatuses connected to a PC. For example, "Devices and Printers" is a window that displays a peripheral apparatus (or a plurality of apparatuses) connected to the PC. "Device Stage" (international registered trademark) is a visual screen that displays a link to a unique application or service provided by each apparatus. Therefore, users can easily access various functions and services relating to respective peripheral apparatuses.

Conventionally, transmission of a print instruction from a Windows® application to a peripheral apparatus (e.g., a printer, a scanner, a copying machine, or a multifunction peripheral) is performed according to the following procedure. More specifically, the procedure includes selecting an apparatus as an output destination and causing the selected apparatus to perform printing, as processing to be executed after an application is launched by a user.

For example, a technique discussed in Japanese Patent Application Laid-Open No. 2005-85132 can be used to select an apparatus as an output destination. More specifically, an information processing apparatus can communicate with a plurality of printers. When the information processing apparatus transmits generated print data to a printer selected from the plurality of printers, the processing procedure includes acquiring a status of a predetermined printer and switching a registered default printer to another printer based on the acquired status of the predetermined printer. The switching processing can be executed by referring to priority information of each printer serving as a default printer.

The processing procedure further includes detecting a printer whose status is changed, determines whether the detected printer is a printer having a highest priority, and performing default printer switching processing based on a determination result.

In a case where a linked application is launched from the "Device Stage" screen, printing is executed according to a printing procedure different from the conventional procedure.

1) The "Device Stage" screen is displayed via the "Devices and Printers" screen. Therefore, a user first selects a specific apparatus on the "Devices and Printers" screen, and then the user opens the "Device Stage" screen and launches the application.
2) Subsequently, the user tries to execute printing using the launched application. In this case, an apparatus intended by the user may not be selected even thought the apparatus is once selected on the "Devices and Printers" screen.

More specifically, in a case where printing is instructed from an application, a default apparatus (i.e., usually used printer) previously set for the PC is brought into an initially selected state. Therefore, in a case where an apparatus associated with the "Device Stage" screen is not the predetermined apparatus preliminarily set for the system, an apparatus that is not intended by a user may be initially set for the system even after the user has recognized completion of the selection of a desired apparatus on the "Devices and Printers" screen. As a result, the user is required to repeat the above-described apparatus selection. Therefore, the user interface is inferior in operability.

SUMMARY OF THE INVENTION

According to an aspect of the present invention, an information processing apparatus can communicate with a plurality of peripheral apparatuses. The information processing apparatus includes a setting unit configured to set a predetermined peripheral apparatus as a control target peripheral apparatus of the information processing apparatus, a display unit configured to display a management screen that corresponds to a second peripheral apparatus, a launch control unit configured to launch an application associated with the management screen in response to an instruction entered via the device management screen that corresponds to the second peripheral apparatus, and a selection unit configured to input identification information of the peripheral apparatus, in response to the launching of the application, thereby causing the second peripheral apparatus to be selected as the control target peripheral apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a flowchart illustrating an example of device management screen launch processing according to an exemplary embodiment of the present invention.

FIG. 8 illustrates an example of a control file for device management according to an exemplary embodiment of the present invention.

DESCRIPTION OF THE EMBODIMENTS

Various exemplary embodiments, features, and aspects of the invention will be described in detail below with reference to the drawings.

In the following exemplary embodiment, a "Devices and Printers" screen (see FIG. 5A) can be displayed when it is selected from a "start menu" screen of the Windows. Further, a "Device Stage" screen (see FIG. 5B) of each apparatus can be opened when it is selected from the "Devices and Printers" screen. For example, in a case where the selected apparatus is a printer, the "Device Stage" screen can display a link to an application that enables users to open photos or documents to display or print.

Further, the "Device Stage" screen can display a link to a status monitor that acquires information indicating an operational state of an apparatus (e.g., a printer or a scanner) and manages the apparatus. Further, there are various online services available via the Internet for information processing apparatuses and peripheral apparatuses. For example, if the "Device Stage" screen provides a link to a support site on the Internet that is provided by a manufacturer of an apparatus, users can easily access an intended site relating to their apparatuses.

The problem of the above-described apparatus is already described. The "Device Stage" screen is an example of a device management screen associated with a predetermined device.

Figure 1:
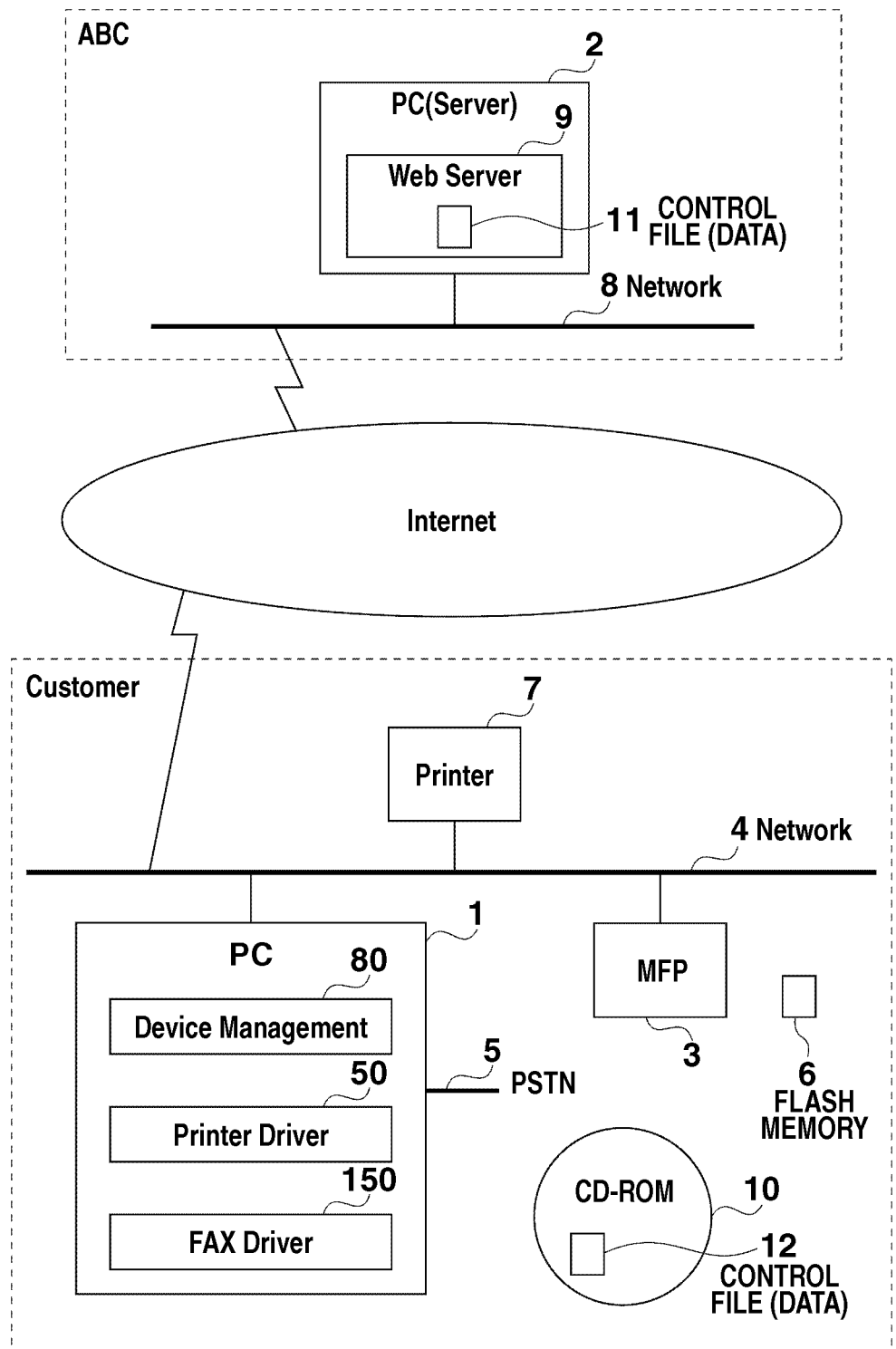
FIG. 1 is a block diagram illustrating a system configuration according to an exemplary embodiment of the present invention.

FIG. 1 is a block diagram illustrating a system configuration of a peripheral apparatus control system including an information processing apparatus and a peripheral apparatus according to an exemplary embodiment of the present invention. The peripheral apparatus control system illustrated in FIG. 1 includes two information processing apparatuses 1 and 2 that can be constituted by general PCs.

Figure 2A:
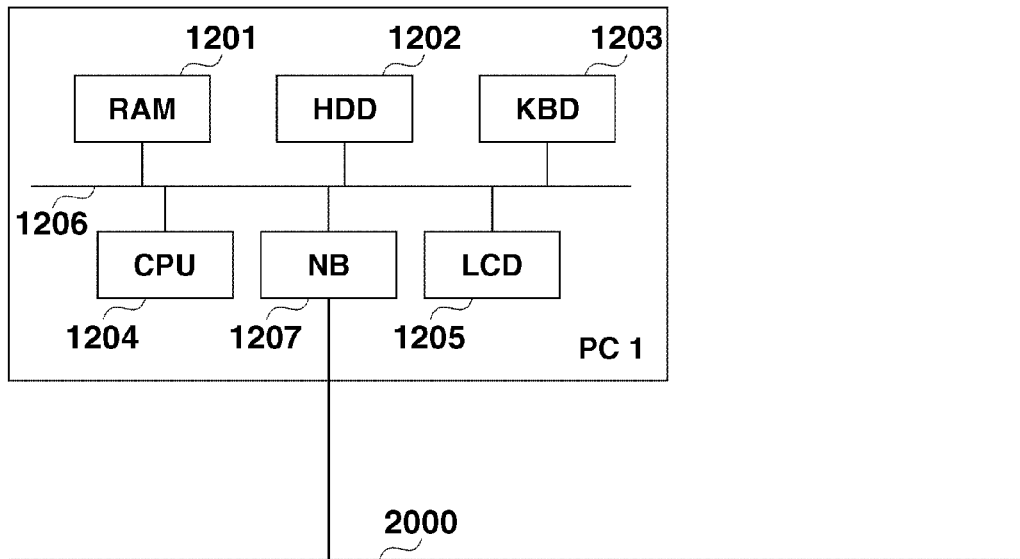
FIG. 2A is a block diagram illustrating an example of a hardware configuration of a personal PC according to an exemplary embodiment of the present invention.

FIG. 2A illustrates an example of a hardware configuration of the PC 1 or the PC 2 on which Windows 7 (product name) provided by Microsoft Corporation or its equivalent is installed as an operating system (OS). The PC 1 is connected to a network 4 that is constituted by Ethernet®. The PC 2 is connected to a network 8 that is also constituted by Ethernet®. A multi function printer (hereinafter, referred to as MFP) 3 can be constituted by a color inkjet printer, a color facsimile machine, or a color scanner.

The MFP 3 is an example of a peripheral apparatus according to the present invention. The MFP 3 is, for example, a multifunction peripheral having a model name "Kmmn", which is manufactured by ABC Corporation. The peripheral apparatus according to the present invention is not limited to the MFP 3 and can be constituted by a printer, a copying machine, a facsimile machine, a scanner, a digital camera, or any other apparatus having comparable functions.

Figure 2B:
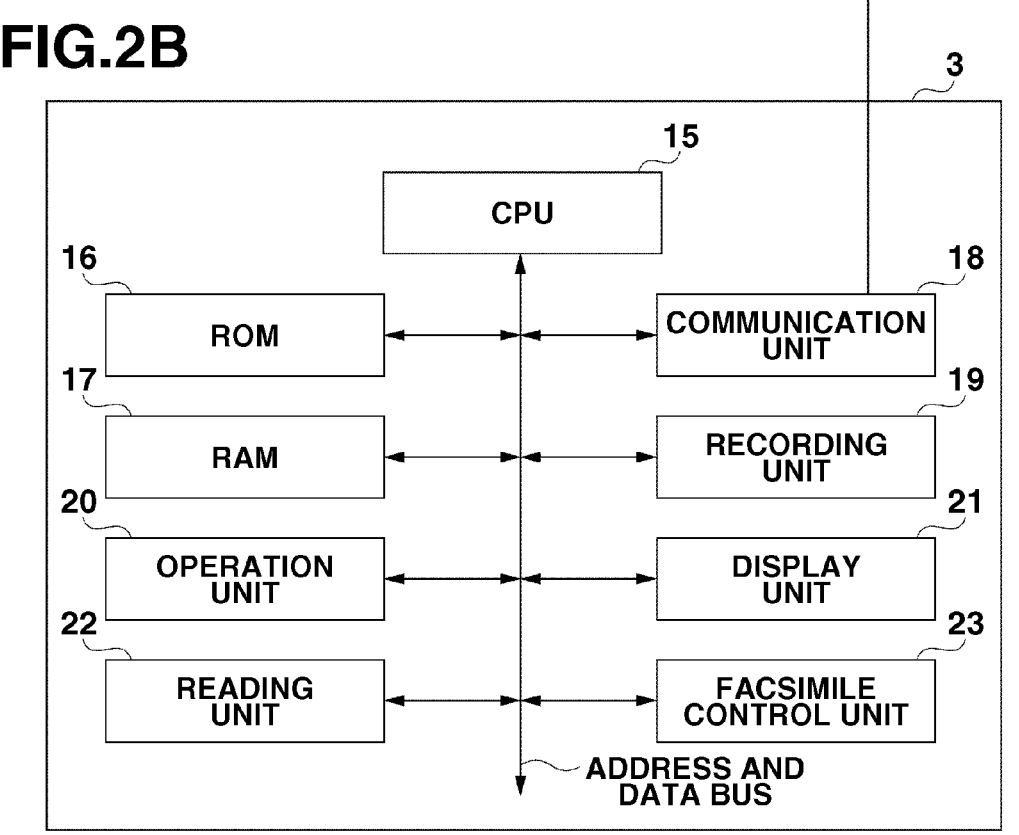
FIG. 2B is a block diagram illustrating an example of a hardware configuration of a printer according to an exemplary embodiment of the present invention.

FIG. 2B illustrates an example of a hardware configuration of the MFP 3. The MFP 3 is connected to the PC 1 via the network 4 to perform bi-directional communications. The PC 1 includes an application 80 that is constituted by an executable file (*.EXE) for Windows®.

Figure 4:
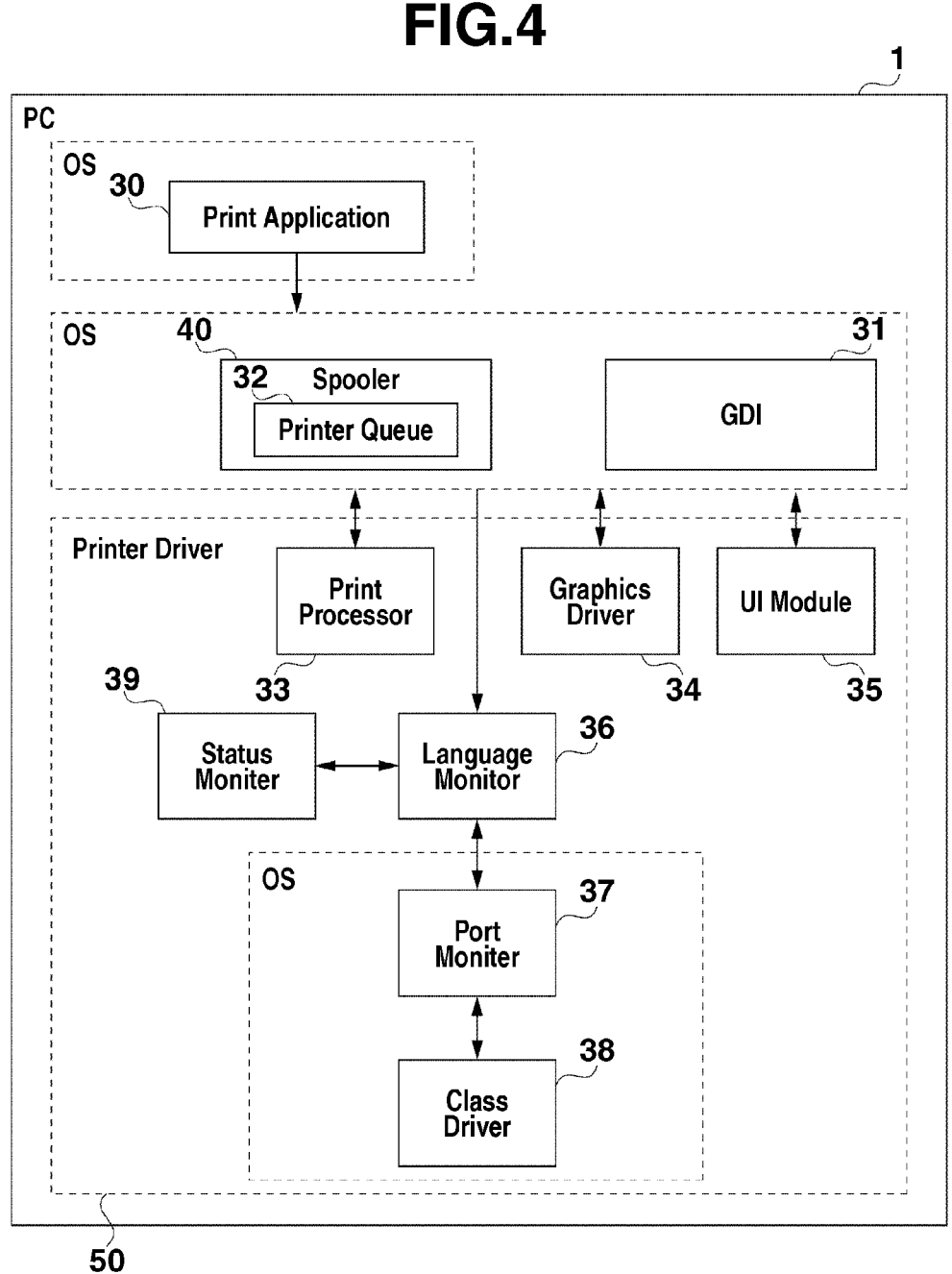
FIG. 4 illustrates an example of a software configuration of a printer driver installed on the PC according to an exemplary embodiment of the present invention.
Figure 5A:
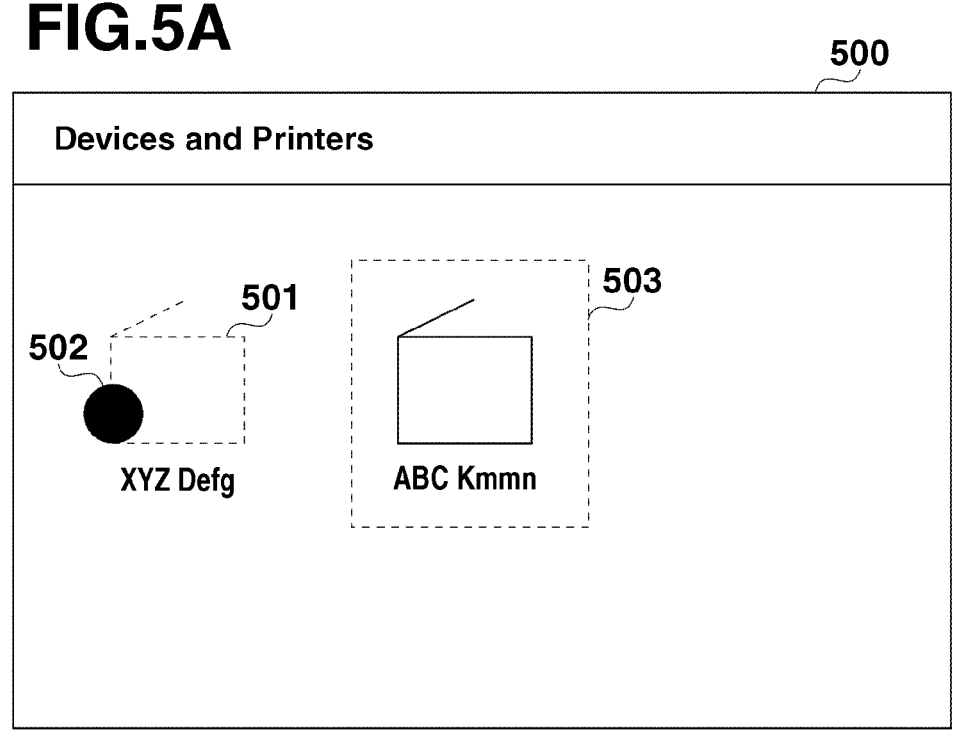
FIG. 5A illustrates an example of a "Devices and Printers."
Figure 5B:
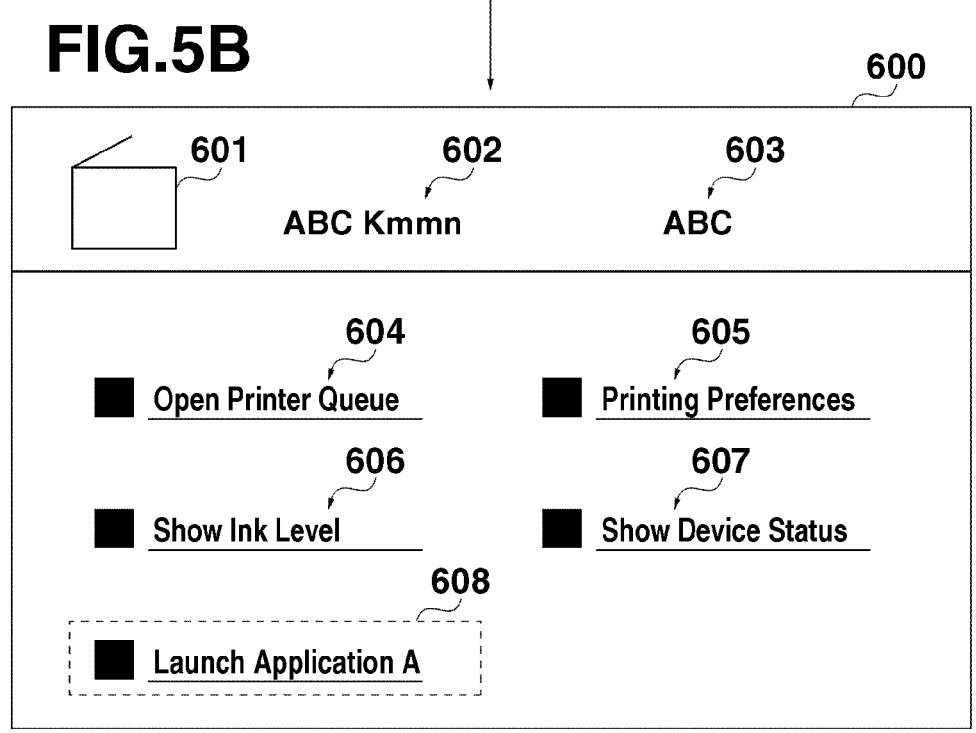
FIG. 5B illustrates an example of a device management screen.

As an example function relating to the present invention, the application 80 can display device management screens illustrated in FIGS. 5A and 5B. The PC 1 further includes a printer driver 50 (see FIG. 4) and a FAX driver 150. The network 4 is a private network constructed in a house of a user (i.e., a client) who uses the MFP 3. The MFP 3 is connected to the PC 1 via the network 4 and can be commonly used among a plurality of users in the house.

The network 8 is an office network provided for use in ABC Corporation. The PC 2 connected to the network 8 includes a Web server 9 that has Web server functions to provide a Web site of ABC Corporation via the Internet. A compact disk read only memory (CD-ROM) 10 is a portable storage medium that can be inserted into the PC 1. The CD-ROM 10 can store software programs and electronic files.

The Web server 9 can distribute a control file (data) for use in device management (hereinafter, referred to as "control file 11 for device management"). The CD-ROM 10 can also distribute a control file (data) 12 for use in device management (hereinafter, referred to as "control file 12 for device management").

The PC 1 can use an analog telephone circuit 5 for facsimile transmission or reception. A flash memory 6 can be inserted into a dedicated slot (not illustrated) of the MFP 3. The flash memory 6 serves as a storage that the PC 1 can refer to. A printer 7 is a printer having a model name "Defg" and manufactured by XYZ Corporation. The printer 7 is a device different from the MFP 3 in type. For example, the printer 7 is a laser printer having a single function or an inkjet printer. A print engine is any one of an inkjet type, an electrophotographic type, a color type, or a monochrome type.

FIG. 2A is a block diagram illustrating an example of a hardware configuration of the PC 1. The PC 2 has a hardware configuration substantially similar to that of the PC.

As illustrated in FIG. 2A, the PC 1 includes a random access memory (RAM) 1201, a hard disk drive (HDD) 1202 serving as a storage unit, a keyboard (KBD) 1203 serving as an input unit, and a central processing unit (CPU) 1204 serving as a control unit. The PC 1 further includes a liquid crystal display device (LCD) 1205 serving as a display unit, a network board (NB) 1207 serving as a communication control unit, and a bus 1206 that connects the above-described functional units of the PC 1.

The HDD 1202 can be replaced with a portable CD-ROM or a built-in ROM that can also serve as a storage unit. An application for device management 80 and respective modules (software programs) illustrated in FIG. 3, FIG. 4, FIG. 9, and FIG. 15 can be stored in the HDD 1202. The CPU 1204 can execute each module (software program) loaded into the RAM 1201 from the HDD 1202. Therefore, the CPU 1204 can realize functions of the application for device management 80 and various functions of respective modules (software programs) illustrated in FIG. 3, FIG. 4, FIG. 9, and FIG. 15.

FIG. 2B is a block diagram illustrating an example of a hardware configuration of the MFP 3. The MFP 3 illustrated in FIG. 2B includes a CPU 15 that can be constituted by a microprocessor capable of serving as a central processing unit of the MFP 3. The CPU 15 controls a RAM 17, a communication unit 18, a recording unit 19, an operation unit 20, a display unit 21, a reading unit 22, and a facsimile control unit 23 according to programs stored in a ROM 16.

The ROM 16 stores software programs that cause the MFP 3 to perform recording (printing) processing under the control of the printer driver 50 (see FIG. 4) and perform processing for transmitting information indicating an operational state of the MFP 3 to the PC 1. The RAM 17 temporarily stores print data mainly transmitted from the PC 1. The recording unit 19 performs printing based on the print data stored in the RAM 17. Further, the RAM 17 temporarily stores image data read by the reading unit 22, facsimile transmission data received from the PC 1, and facsimile reception data received by the facsimile control unit 23.

The communication unit 18 includes a connection port for the network 4 and a connection port for the analog telephone circuit 5. The communication unit 18 controls analog communications, such as Ethernet and facsimile. The recording unit 19 includes a recording unit and an electric circuit. The recording unit includes an inkjet type recording head, a color ink cartridge, a carriage, and a recording sheet conveyance mechanism. The electric circuit, such as ASIC, controls the recording head to generate pulses for printing based on the print data.

When a printing operation or a facsimile transmission operation is made by a user via a print application, contents (image data) of a displayed file that is opened by the application are temporarily stored, as an EMF type spool file, in the HDD 1202 of the PC 1. Then, the image data are converted via the printer driver 50 or the FAX driver 150 into print data or facsimile transmission data including a command for controlling the MFP 3, and then transmitted via the network 4 to the MFP 3.

When the MFP 3 receives print data, the recording unit 19 converts the received print data into pulses for printing and prints an image on a recording sheet. When the MFP 3 receives facsimile transmission data, the facsimile control unit 23 converts the received facsimile transmission data into facsimile communication protocols and transmits facsimile data to a facsimile apparatus of another user via the analog telephone circuit 5.

The operation unit 20 includes a power source button, a reset button, and other various buttons, which enable users to operate the MFP 3. The display unit 21 is, for example, constituted by a touch panel or a liquid crystal display device. The display unit 21 can display an operational state of the MFP 3 and can also display various setting information and telephone numbers, which may be input by users.

The reading unit 22 includes a color image sensor and an electric circuit constituted by ASIC for image processing. The facsimile control unit 23 is constituted by a facsimile modem or an analog communication circuit. The facsimile control unit 23 controls transmission and reception of facsimile data according to facsimile communication protocols. The apparatus illustrated in FIG. 2A can communicate with the MFP 3 via a network 2000. The network 2000 is a network constituted by at least one of the network 8, the Internet, and the network 4 or a combination thereof.

Figure 3:
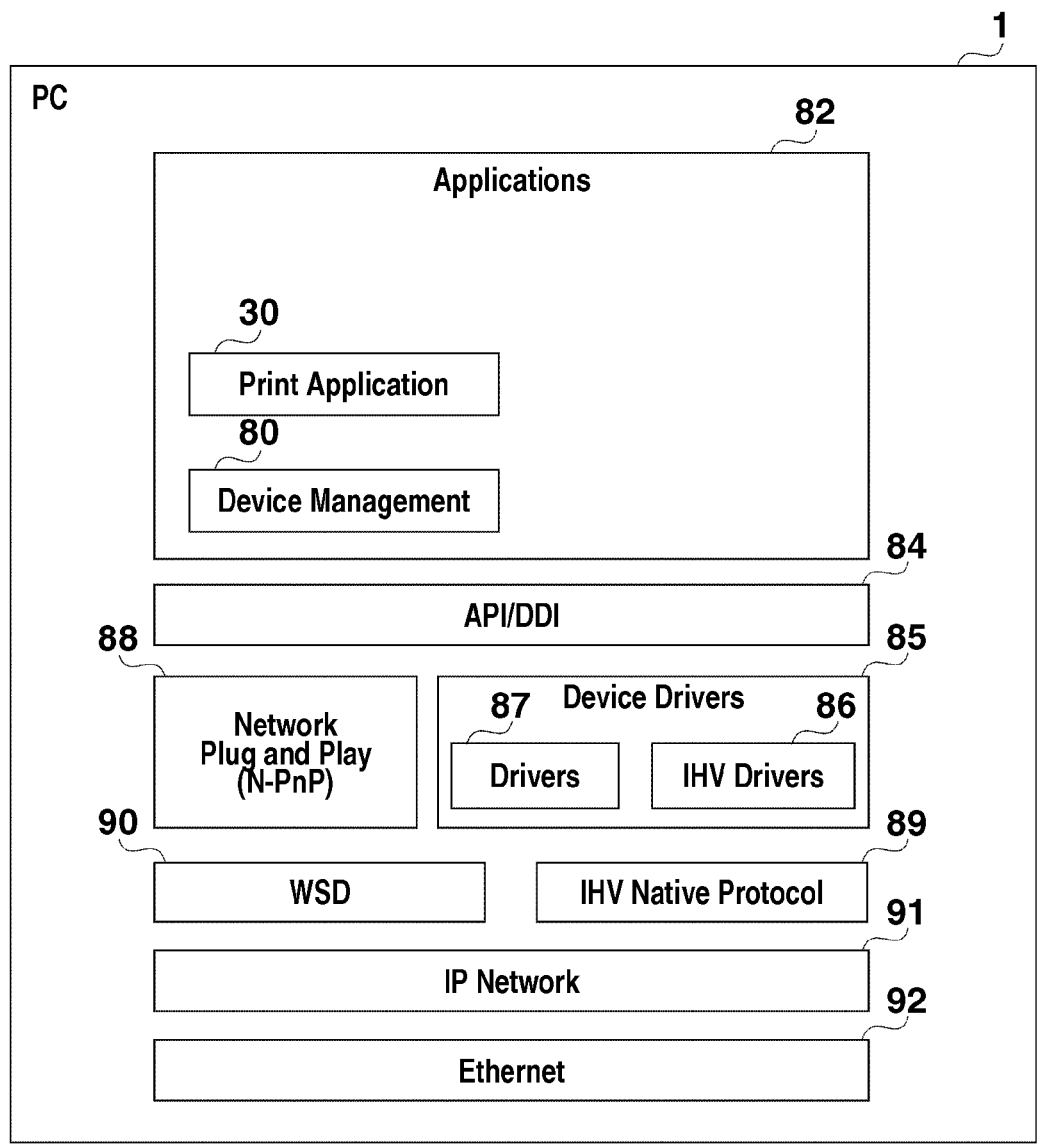
FIG. 3 illustrates an example of a software configuration of the PC according to an exemplary embodiment of the present invention.

FIG. 3 illustrates an example of a software configuration of the PC 1, which includes an Ethernet control stack 92, an IP Network control stack 91, a WSD control stack 90, an IHV native protocol control stack 89, an N-PnP control stack 88, a device driver group 85, an application/DDI interface 84, and an application group 82.

The Ethernet control stack 92 can control the Ethernet. The IP Network control stack 91 can control the Internet Protocol (IP) Network. The WSD control stack 90 can control the Device Profile for Web Service (WSD). The IHV native protocol control stack 89 can control unique protocols of the Independent Hardware Vendor (IHV). The N-PnP control stack 88 can control the Network Plug and Play (hereinafter, referred to as "N-PnP").

For the purpose of providing a support for network connection devices, Windows Vista® OS includes an extended plug and play function, which is referred to as "Plug and Play Extensions" (PnP-X), as an initially installed standard function. However, the "N-PnP" function is used in the present exemplary embodiment, which is a function comparable to the PnP-X function.

The device driver group 85 includes a standard driver group 87 incorporated as standard software programs in the program package for the OS. The device driver group 85 further includes an IHV-made driver group 86 that can be provided from the IHV. The application/DDI interface 84 includes an Application Programming Interface (API) and a Device Driver Interface (DDI). The application for device management 80 (hereinafter, referred to as "device management 80") is a standard software program incorporated in the program package for the OS.

A print application 30 is described below with reference to FIG. 4. The application group 82 includes the device management 80 and the print application 30. The device management 80 manages and executes a "Devices and Printers" folder 500 illustrated in FIG. 5A and a device management screen 600 illustrated in FIG. 5B. The software configuration of the PC 1 illustrated in FIG. 3 is applicable to the PC 2 illustrated in FIG. 1.

FIG. 4 illustrates an example configuration of a printer driver installed on the PC 1, which is differently illustrated compared to the configuration of FIG. 3. In FIG. 4, the printer driver 50 is a driver for the MFP 3 that is installed on the PC 1. The printer driver 50 illustrated in FIG. 4 includes a plurality of modules 33 to 36 and 39. The print application 30 is, for example, an application that corresponds to a Notepad (Notepad. exe) serving as a text editor, which is a standard application incorporated in the program package for the OS.

The OS includes a Graphics Device Interface (GDI) 31 and a spooler 40. The spooler 40 includes a printer queue 32 that performs queuing of print jobs. A printer queue folder displays the queued print jobs. The print processor 33 can change a print layout and can perform special processing on a printed image. The graphics driver 34, which serves as a core part of the printer driver 50, performs image processing for printing based on a drawing command transmitted from the GDI 31 and generates a print control command.

The UI module 35 can provide a user interface for the printer driver 50 and can control the user interface. The language monitor 36, serving as a data communication interface (I/F), can control transmission and reception of data. The status monitor 39 can display an ink remaining amount of each ink usable by the MFP 3 and can also display warning, error, and other states.

A port monitor 37 can perform processing for receiving data from the language monitor 36 and transmitting the received data to an appropriate port. The port monitor 37 can further perform processing for receiving data from the MFP 3 via a class driver 38. The class driver 38 is a low-level module closest to the port. In the present invention, the class driver 38 corresponds to a driver for a unique protocol (WSD or IHV) printer class, which controls the port (e.g., a network port in the present invention). The printer driver 50 is a driver provided by ABC Corporation (i.e., a manufacturer of the MFP 3).

The N-PnP control stack 88, the WSD control stack 90, the IP Network control stack 91, the Ethernet control stack 92, and the application/DDI interface 84 are modules provided by the OS. The GDI 31 illustrated in FIG. 4 partly corresponds to the module 84. More specifically, the GDI 31 is an interface that can be called by the application. The graphics driver 34 has a function of converting data input via the GDI interface into a DDI command. The graphics driver 34 and the UI module 35 correspond to the standard driver group 87 and the N-PnP control stack 88 illustrated in FIG. 3. The IHV native protocol control stack 89 has a function that corresponds to the function of the port monitor 37 illustrated in FIG. 4, although it is limited to a portion that the IHV can provide as an extension function of the OS.

FIG. 5A illustrates an example of the "Devices and Printers" folder 500. The "Devices and Printers" folder 500 illustrated in FIG. 5A is displayed on the PC 1. The "Devices and Printers" folder 500 indicates drivers of printers and facsimile machines that are usable by the PC 1. In the present exemplary embodiment, a device 501 named as "XYZ Defg" and a device 503 named as "ABC Kmmn" are printers currently usable for the PC 1. A default mark 502, which is attached to the device 501 named as "XYZ Defg", is a mark indicating a system default printer. If a user clicks on a symbol mark indicating the device 503 named as "ABC Kmmn" with a mouse, the device management screen illustrated in FIG. 5B can be displayed.

Figure 13:
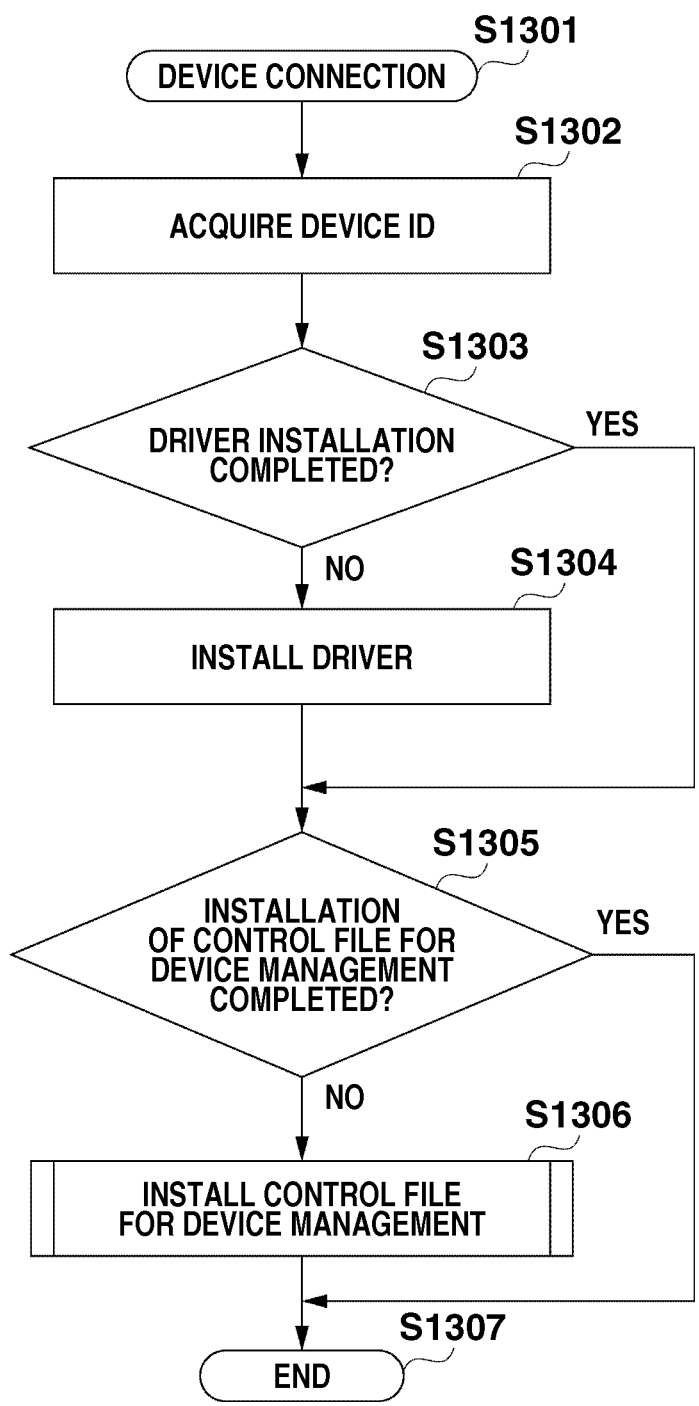
FIG. 13 is a flowchart illustrating an example of device connection processing according to an exemplary embodiment of the present invention.

FIG. 13 is a flowchart illustrating an example of processing to be started when the MFP 3 (or the printer 7) is connected to the PC 1 via a network and an USB interface. A computer program relating to the flowchart illustrated in FIG. 13 (i.e., the device management 80) is usually stored in the HDD 1202 and can be executed by the CPU 1204 when the program is loaded into the RAM 1201 from the HDD 1202. The program (i.e., the device management 80) can be realized as an installation control program provided as a part of the OS or an application program.

In step S1301, the device management 80 starts the processing of the flowchart illustrated in FIG. 13 when the PC (e.g., the PC 1) is connected to an external device (e.g., the MFP 3) via the network 4. In step S1302, the PC 1 acquires a device ID of the device (i.e., the MFP 3). The device ID acquired in step S1302 is, for example, "MFG:ABC;MDL: Kmmn;CLS:PRINTER;CMD:K4;DES:ABC Kmmn;", which is expressed using a character string. The PC 1 can acquire a device ID of any printer function of the MFP 3 from the MFP 3 via the network 4. The device ID includes the following information.

Manufacturer (MFG:): ABC
Model (MDL:): Kmmn
Class (CLS:): PRINTER
Command (CMD:): K4 (private command used for print control by ABC Corporation)
Description (DES:): ABC Kmmn Next, in step S1303, the device management 80 determines whether installation of the driver (e.g., the printer driver 50 and the FAX driver 150) is already completed. If it is determined that there is not any installed driver (NO in step S1303), then in step S1304, the device management 80 installs the driver (e.g., the printer driver 50 and the FAX driver 150).

If the installation of the driver (e.g., the printer driver 50 and the FAX driver 150) is successfully completed, a printer mark corresponding to the newly installed driver is added (registered) to the "Devices and Printers" folder 500 illustrated in FIG. 5A.

If it is determined that the driver (the printer driver 50 and the FAX driver 150) is already installed (YES in step S1303), the processing proceeds to step S1305.

Then, in step S1305, the device management 80 determines whether the control file for device management (see FIG. 8) is not yet installed. To perform the determination processing in step S1305, the device management 80 can refer to manufacturer information (MFG:) and model information (MDL:) included in the device ID to check whether the installed control file for device management matches with the driver (the printer driver 50 and the FAX driver 150).

Figure 14:
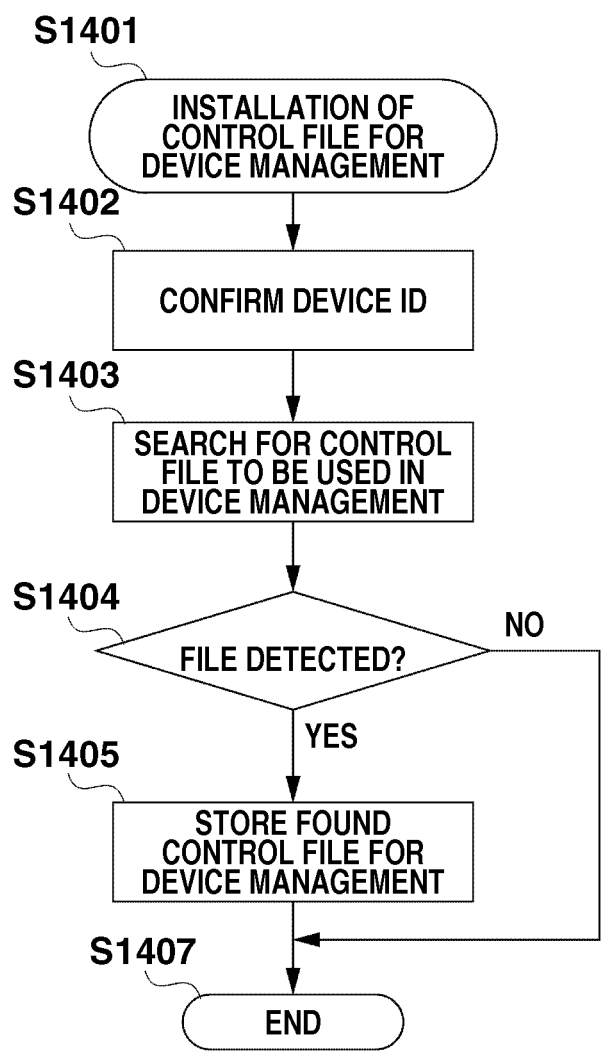
FIG. 14 is a flowchart illustrating an example of processing for installing a control file for device management according to an exemplary embodiment of the present invention.

If it is determined that the installation of the control file is not yet completed (NO in step S1305), then in step S1306, the device management 80 executes processing for installing the control file for device management as illustrated in FIG. 14 and completes the processing. If it is determined that the control file for device management is already installed (YES in step S1305), then in step S1307, the device management 80 terminates the processing routine illustrated in FIG. 13.

FIG. 14 is a flowchart illustrating example processing for installing the control file for device management. A computer program relating to the flowchart illustrated in FIG. 14 (i.e., the device management 80) is usually stored in the HDD 1202 and can be executed by the CPU 1204 when the program is loaded into the RAM 1201 from the HDD 1202. The program can be realized as an installation control program to be provided as a part of the OS or an application program.

In step S1401 illustrated in FIG. 14, the device management 80 starts file installation processing when the device management 80 determines to execute the processing for installing the control file for device management in step S1306 of FIG. 13. First, in step S1402, the device management 80 confirms a device ID of the MFP 3 (i.e., the device connected via the network 4).

In step S1403, the device management 80 searches for a control file for device management dedicated to the MFP 3 (i.e., the device connected to the PC 1) based on the manufacturer information (MFG:) and the model information (MDL:) included in the device ID.

A control file 800 for device management illustrated in FIG. 8 includes descriptions relating to the device (the MFP 3). More specifically, a description relating to the manufacturer (MFG:) "ABC" is included in an element 801 indicating a description <dm:manufacturer> and a description relating to the model (MDL:) "Kmmn" is included in an element 802 indicating a description <dm:model>.

The device management 80 searches for the control file for device management dedicated to the MFP 3 from various control files for device management stored in the Web server 9 or the CD-ROM 10 inserted in the PC 1 based on the information described in the elements 801 and 802.

In step S1404, the device management 80 determines whether the control file 11 for device management or the control file 12 for device management has been found. If it is determined that the control file 11 for device management or the control file 12 for device management is detected (YES in Step S1404), then in step S1405, the device management 80 stores the detected control file for device management in the HDD 1202 of the PC 1.

In step S1406, the device management 80 terminates the file installation processing illustrated in FIG. 14. In the present exemplary embodiment, the device management 80 detects installation of the control file 800 for device management that corresponds to the device (the MFP 3).

If it is determined that neither the control file 11 for device management nor the control file 12 for device management was detected (NO in Step S1404), then in step S1406, the device management 80 terminates the processing routine without installing any control file for device management.

FIG. 7 is a flowchart illustrating example processing for launching the device management screen 600. A computer program relating to the flowchart illustrated in FIG. 7 is usually stored in the HDD 1202 and can be executed by the CPU 1204 when the program is loaded into the RAM 1201 from the HDD 1202.

Figure 9:
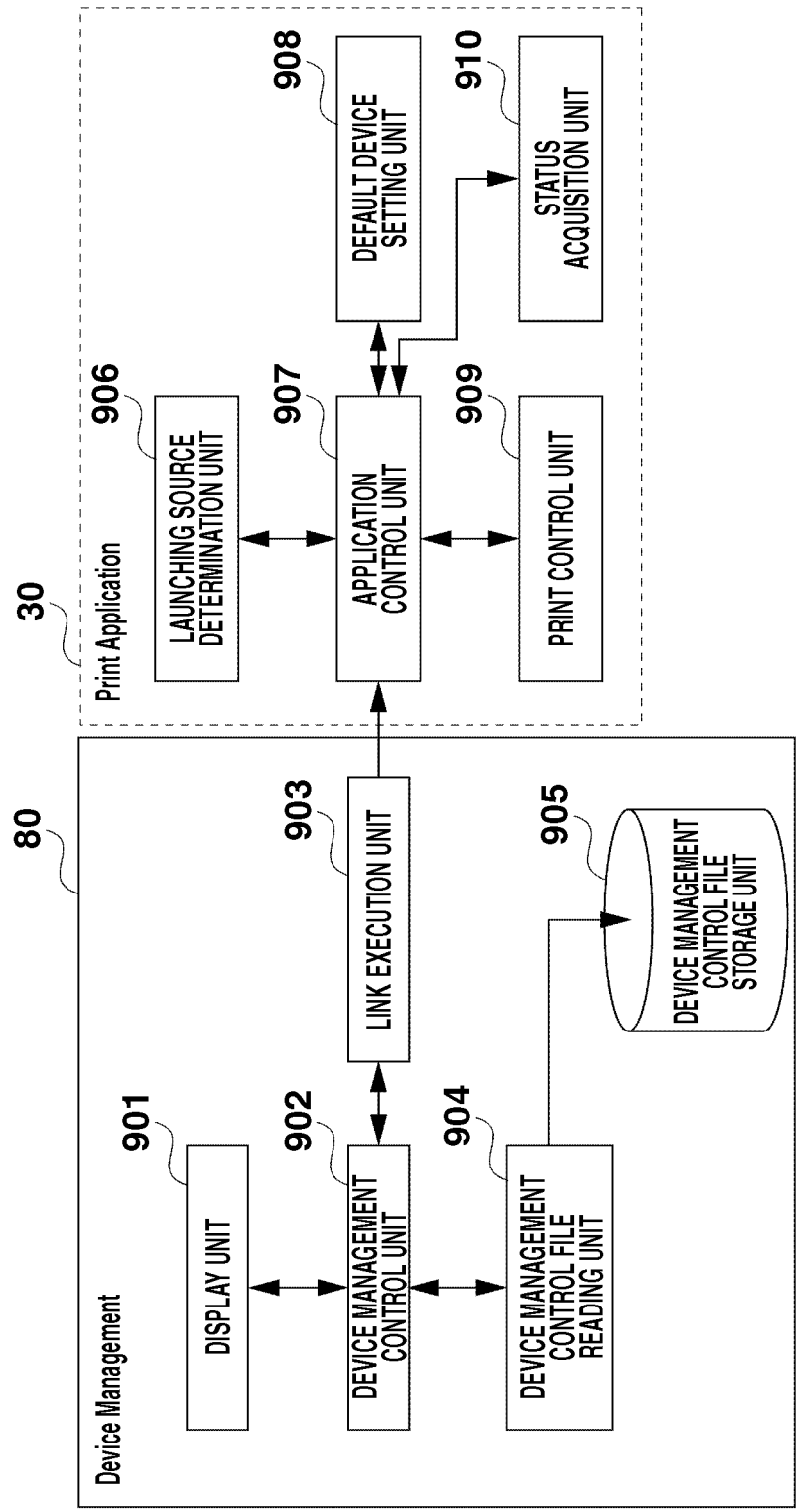
FIG. 9 illustrates an example of a software configuration of device management and print application according to an exemplary embodiment of the present invention.

FIG. 9 illustrates an example of a software configuration of the device management 80 and the print application 30. A detailed configuration of FIG. 9 corresponds to a part of FIG. 3. The device management 80 includes a display unit 901, a device management control unit 902, a link execution unit 903, a device management control file reading unit 904, and a device management control file storage unit 905. The device management control file storage unit 905 stores the control file 800 for device management having been stored in step S1405 of FIG. 14.

The print application 30 includes a launching source determination unit 906, an application control unit 907, a default device setting unit 908, a print control unit 909, and a status acquisition unit 910. The device management screen 600 is launched and displayed when a device is selected from the "Devices and Printers" folder 500 illustrated in FIG. 5A. For example, when the device 503 is selected in FIG. 5A, the device management screen 600 is launched as illustrated in FIG. 5B.

In step S701, the device management 80 starts device management screen launch processing in response to selection of the device 503 from the "Devices and Printers" folder 500.

Next, in step S702, the device management control unit 902 acquires a device name of the device selected from the "Devices and Printers" folder 500. In the present exemplary embodiment, the device management control unit 902 acquires a device name "ABC Kmmn" of the selected device 503.

Next, in step S703, the device management control file reading unit 904 loads the control file 800 for device management stored in step S1405 in FIG. 14. Then, in step S704, the device management control file reading unit 904 parses contents of the control file 800 for device management illustrated in FIG. 8. In step S705, the device management control unit 902 causes the display unit 901 to display the device management screen 600 according to the contents of the parsed data. Then, in step S706, the device management control unit 902 terminates the processing routine illustrated in FIG. 7.

The control file 800 for device management illustrated in FIG. 8 includes, in addition to the above-described element 801 <dm:manufacturer> and the element 802 <dm:model> that are information required in installation, information required to constitute the device management screen 600.

The device management screen 600 includes an upper field in which a device icon 601, a device name 602, and manufacturer information 603 are displayed. The data of the device icon 601 is stored as a part of storage data in the device management control file storage unit 905, although not illustrated. Further, the displayed device name 602 is the name of the device 503 selected from the "Devices and Printers" folder 500. The displayed manufacturer information 603 is a character string designated in the element 801 <dm:manufacturer>.

The device management screen 600 includes a lower field in which links to various functions relevant to the device 503 are displayed. More specifically, a printer queue button 604, a print setting button 605, an ink remaining amount button 606, a device status button 607, and an application "A" launch button 608 are displayed. An element 803 indicating a description <dm:functions> illustrated in FIG. 8 includes five elements denoted by <dm:function> each describing a button and its function.

First, the first element <dm:function> is described in detail. An element 805 indicating a description <dm:name xml:lang="en-US">Open Printer Queue</dm:name> includes a character string "Open Printer Queue" to be displayed on the printer queue button 604. An element 806 indicating a description <dm:execute>open Printer Queue</dm:execute> includes a code "open Printer Queue" that represents a function (program) for displaying a printer queue folder. Although not illustrated in the drawings, the printer queue folder has a function for displaying a state of a print job.

Therefore, in step S705, the device management control file reading unit 904 parses the element <dm:function> and the display unit 901 displays the character string described in the element 805 on the printer queue button 604 illustrated in FIG. 5B. If the printer queue button 604 is pressed, the function described in the element 806 is executed and, as a result, the printer queue folder is displayed.

Next, the second element <dm:function> is described in detail. An element 807 indicating a description <dm:name xml:lang="en-US">Printing Preferences</dm:name> includes a character string "Printing Preferences" to be displayed on the print setting button 605. An element 808 indicating a description <dm:execute>printing Preferences</dm:execute> includes a code "printing Preferences" that represents a function (program) for displaying a print setting dialog. Although not illustrated, the print setting dialog is a print setting screen that can be provided by the UI module 35 of the printer driver 50.

Therefore, in step S705, the device management control file reading unit 904 parses the element <dm:function> and the display unit 901 displays the character string described in the element 807 on or near the print setting button 605 illustrated in FIG. 5B. If the print setting button 605 is pressed, the function described in the element 808 is executed and, as a result, the print setting dialog is displayed. Descriptions for the third and fourth elements are omitted because operations to be performed for the third and fourth elements are substantially similar to the operations for the above-described first and second elements.

Next, the fifth element <dm:function> is described in detail. An element 813 indicating a description <dm:name xml:lang="en-US">Launch Application A</dm:name> includes a character string "Launch Application A" to be displayed on the application "A" launch button 608. An element 814 indicating a description <dm:execute>% ProgramFiles % ¥ABC¥Application A.exe/devmng/devname</dm:execute> includes a code "% ProgramFiles % ¥ABC¥Application A.exe/devmng/devname" that represents a function for launching a screen for the application "A" illustrated in FIG. 6A.

Figure 6A:
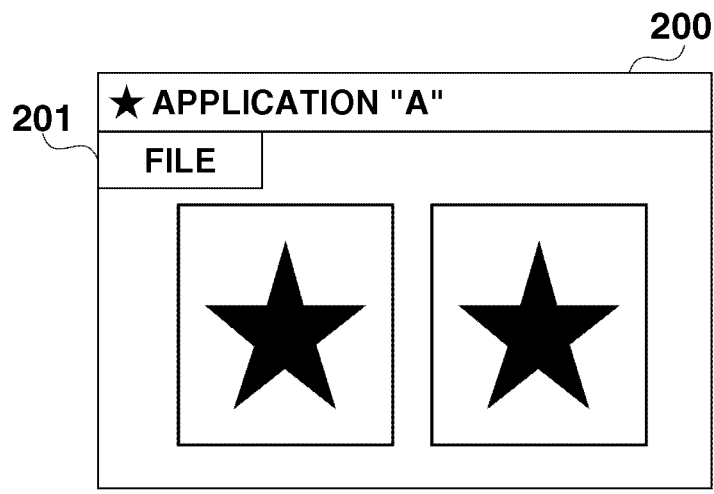
FIG. 6A illustrates an example screen of a print application according to an exemplary embodiment of the present invention.

Therefore, in step S705, the device management control file reading unit 904 parses the element <dm:function> and the display unit 901 displays the character string described in the element 807 on or near the application "A" launch button 608 illustrated in FIG. 5B. If the application "A" launch button 608 is pressed, the function described in the element 814 is executed and, as a result, the screen 200 for the application "A" illustrated in FIG. 6A is displayed. The application "A" corresponds to the print application 30 illustrated in FIG. 9.

Figure 10:
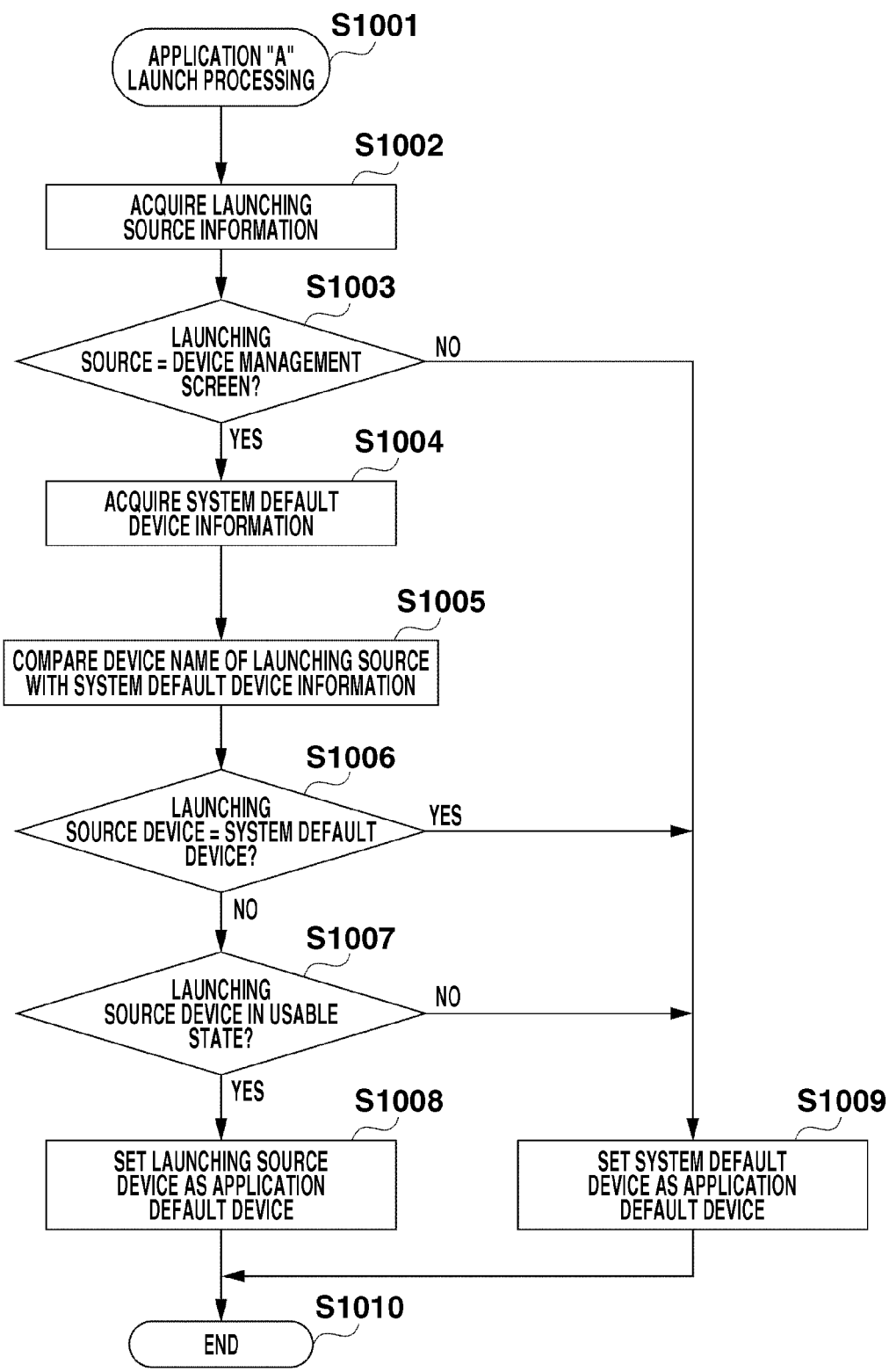
FIG. 10 is a flowchart illustrating an example of print application launch processing according to an exemplary embodiment of the present invention.

FIG. 10 is a flowchart illustrating example processing for launching the print application 30. A computer program relating to the flowchart illustrated in FIG. 10 (i.e., the device management 80) is usually stored in the HDD 1202 and can be executed by the CPU 1204 when the program is loaded into the RAM 1201 from the HDD 1202.

If a user presses the application "A" launch button 608 on the device management screen 600, in step S1001, the device management control unit 902 provided in the device management 80 illustrated in FIG. 9 executes the contents of the element 814 illustrated in FIG. 8 via the link execution unit 903 and starts the application "A" launch processing. Next, in step S1002, the application control unit 907 sends the contents described in the element 814 to the launching source determination unit 908.

According to the example illustrated in FIG. 8, the element 814 includes a description "/devmng" that indicates a launching from the device management screen and a description "/devname" that indicates a device name. When the print application 30 is launched, the link execution unit 903 replaces the description "/devname" with the device name managed by the "Devices and Printers" folder 500 illustrated in FIG. 5A. In the present exemplary embodiment, the device 503 is selected when the device management screen 600 is launched. Therefore, in step S1002, the OS acquires a device name (icon name) "ABC Kmmn" having been set as an icon name illustrated in FIG. 5A and sends the acquired information to the launching source determination unit 908.

Next, in step S1003, the launching source determination unit 908 determines whether the launching source is the device management screen based on an argument in launch processing. In the present exemplary embodiment, the element 814 includes the description "/devmng" and the print application 30 is already launched. Therefore, in step S1003, the launching source determination unit 908 determines that the launching source is the device management screen. For example, in a case where the print application 30 is launched by another source other than the device management screen, the description "/devmng" is not designated as an argument. Therefore, in step S1003, the launching source determination unit 908 determines that the launching source is not the device management screen.

If it is determined that the launching source is the device management screen (YES in step S1003), then in step S1004, the application control unit 907 acquires system default device information via the application/DDI interface 84. The system default device is a device to which the default mark 502 is attached in the "Devices and Printers" folder 500 illustrated in FIG. 5A. In the present exemplary embodiment, the device 501 (XYZ Defg) is set as a default device. Therefore, in step S1004, the application control unit 907 acquires a device name "XYZ Defg."

Next, in step S1005, the application control unit 907 compares the device name of the launching source acquired in step S1002 with the device name acquired in step S1004. In step S1006, based on a comparison result of step S1005, the application control unit 907 determines whether the device name associated with the device management screen 600 of the launching source is the system default device. If it is determined that the device name associated with the device management screen 600 of the launching source is the system default device (YES in step S1006), the processing proceeds to step S1009.

If it is determined that the device name associated with the device management screen 600 of the launching source is not the system default device (NO in step S1006), then in step S1007, the application control unit 907 acquires information indicating a present status of the device 503 of the launching source via the status acquisition unit 910 and determines whether the launching source device is in a usable state.

In the "Devices and Printers" folder 500, the device 501 is unusable because a printer icon corresponding to the device 501 is indicated by a dotted line and the device 503 is usable because a printer icon corresponding to the device 503 is indicated by a solid line.

In the present exemplary embodiment, the launching source device is the device 503. Therefore, in step S1007, the application control unit 907 determines that the launching source device is usable. Then, the processing proceeds to step S1008. On the other hand, if it is determined that the launching source device is unusable (NO in step S1007), the processing proceeds to step S1009.

In step S1008, the application control unit 907 sets the device 503 of the launching source as the default device of the print application 30 via the default device setting unit 908. Then in step S1010, the application control unit 907 terminates the processing routine illustrated in FIG. 10. The information indicating the default device of the print application 30 is stored in a memory area of the RAM 1201 managed by the print application 30.

If it is determined that the launching source is not the device management screen (NO in step S1003), the processing proceeds to step S1009. In step S1009, the application control unit 907 sets the system default device acquired via the application/DDI interface 84 as the default device of the print application 30 via the default device setting unit 908. The information indicating the default device of the print application 30 is stored in a memory area of the RAM 1201 managed by the print application 30. Subsequently, in step S1010, the application control unit 907 terminates the processing routine illustrated in FIG. 10.

When the above-described launch processing for the print application 30 is terminated, the screen 200 for the application "A" is displayed as illustrated in FIG. 6A.

Figure 11:
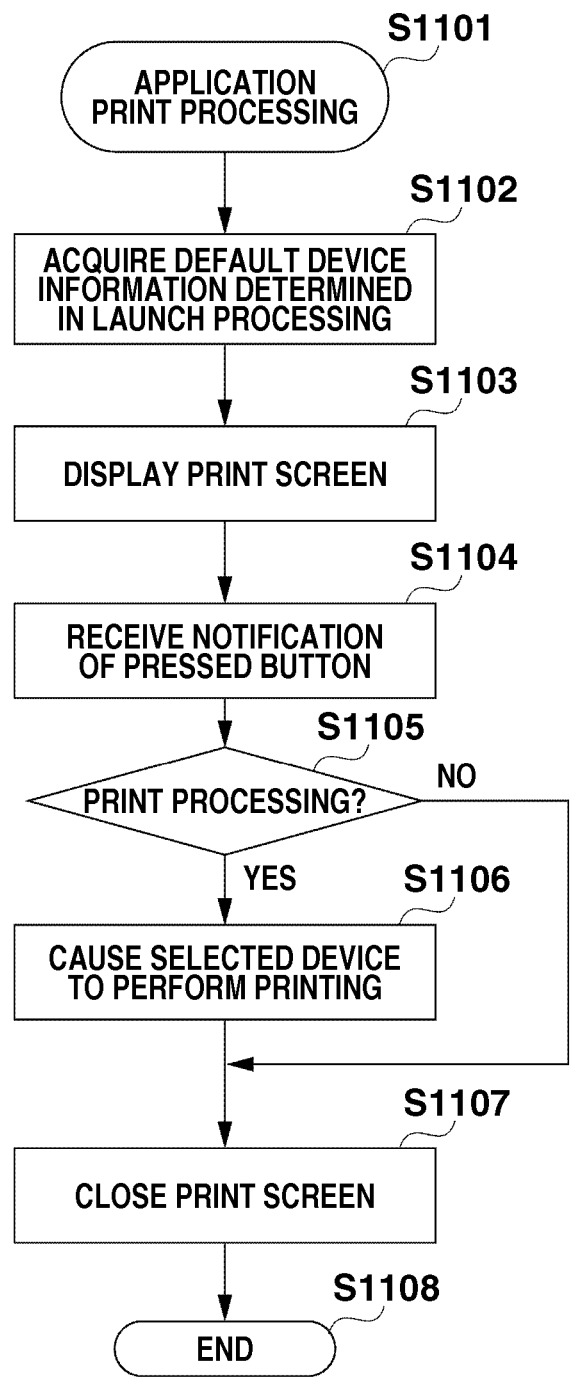
FIG. 11 is a flowchart illustrating an example of print application print processing according to an exemplary embodiment of the present invention.

FIG. 11 is a flowchart illustrating an example of print processing to be executed in response to an instruction of the print application 30. A computer program relating to the flowchart illustrated in FIG. 11 is usually stored in the HDD 1202 and can be executed by the CPU 1204 when the program is loaded into the RAM 1201 from the HDD 1202.

Figure 6B:
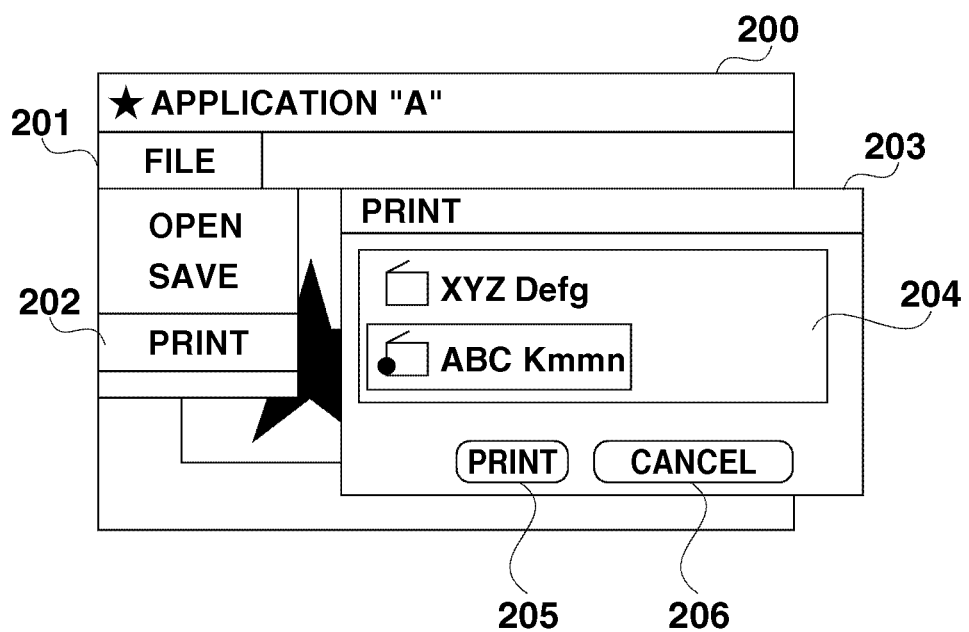
FIG. 6B illustrates an example screen of a print application according to an exemplary embodiment of the present invention.

If a user selects a file menu 201 on the print application 30 illustrated in FIG. 6A, a print menu 202 is displayed as illustrated in FIG. 6B. In this state, if the user further selects the print menu 202 of the file menu 201, then in step S1101, the application control unit 907 starts print processing of the flowchart illustrated in FIG. 11.

First, in step S1102, the application control unit 907 reads information indicating the default device, which was set by the default device setting unit 908 in the launch processing and stored in the RAM 1202.

Next, in step S1103, the application control unit 907 brings the default device acquired in the S1102 into a default selection state via the print control unit 909 and displays a print dialog 203. The print dialog 203 includes a device list 204, a print button 205, and a cancel button 206 that are displayed at predetermined positions in the dialog 203.

More specifically, the device 501 and the device 503 are displayed in the device list 204 as devices currently registered in the "Devices and Printers" folder 500. In the print dialog 203, the device icon "ABC Kmmn" is surrounded by a solid line and therefore the device 503 is in the default selection state. The device 503 is associated with the device management screen of the launching source of the print application 30.

In step S1104, the print control unit 909 receives a notice when a user has pressed any button on the print dialog 203. Then, in step S1105, it is determined whether the print button 205 is pressed. If it is determined that the print button 205 is pressed (YES in step S1105), then in step S1106, the print control unit 909 causes the device selected from the device list 204 to execute print processing. Then, the processing proceeds to step S1107. In step S1107, the application control unit 907 closes the print dialog 203. And, in step S1108, the application control unit 907 terminates the processing routine illustrated in FIG. 11.

On the other hand, if it is determined that the print button 205 is not pressed (NO in step S1105), i.e., when the cancel button 206 is pressed, the application control unit 907 skips the above-described processing of step S1106 and terminates the processing routine illustrated in FIG. 11 after executing the processing of step S1107.

Through the above-described processing, the launching source device is set as a default device in a case where the application is launched from the device management screen. Therefore, it is unnecessary to repeat the processing for selecting a device. As a result, the present exemplary embodiment can improve user operability.

Another exemplary embodiment of the present invention is described below. According to the above-described exemplary embodiment, the default device control is performed by the print application 30. The following exemplary embodiment is different from the above-described exemplary embodiment in that the default device control is performed by the device management 80 and the application/DDI interface 84.

Figure 15:
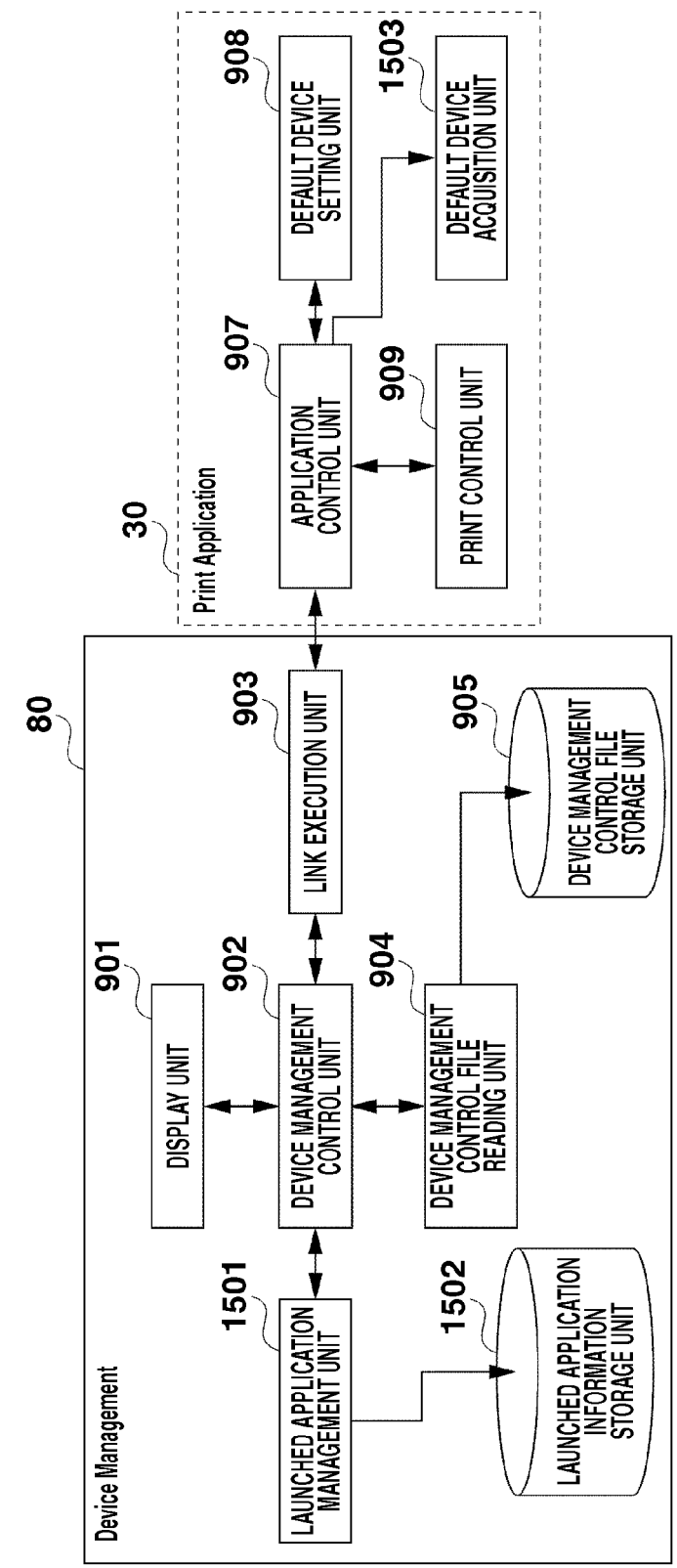
FIG. 15 illustrates an example of a software configuration of device management and print application according to another exemplary embodiment of the present invention.

FIG. 15 illustrates an example of a software configuration including the device management 80 and the print application 30 according to a second exemplary embodiment of the present invention.

The device management 80 includes a display unit 901, a device management control unit 902, a link execution unit 903, a device management control file reading unit 904, a device management control file storage unit 905, a launched application management unit 1501, and a launched application information storage unit 1502. The device management control file storage unit 905 stores the control file 800 for device management, which was stored in step S1405 of the flowchart illustrated in FIG. 14.

The print application 30 includes an application control unit 907, a default device setting unit 908, a print control unit 909, and a default device acquisition unit 1503.

Figure 12:
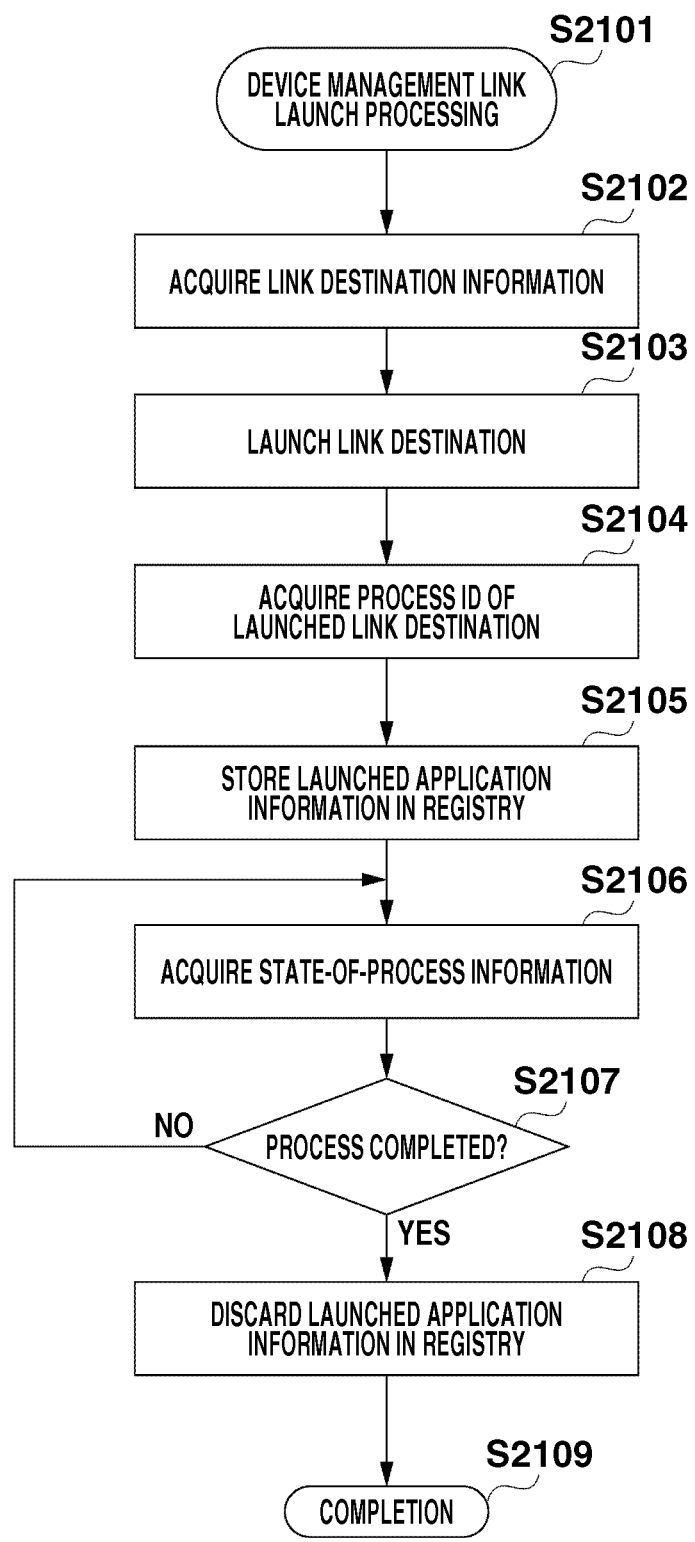
FIG. 12 is a flowchart illustrating an example of device management link launch processing according to an exemplary embodiment of the present invention.

FIG. 12 is a flowchart illustrating an example of processing to be performed in response to depression of the application "A" launch button 608 on the device management screen 600 illustrated in FIG. 5B and the print application 30 is launched.

A computer program relating to the flowchart illustrated in FIG. 12 is usually stored in the HDD 1202 and can be executed by the CPU 1204 when the program is loaded into the RAM 1201 from the HDD 1202.

If a user presses the application "A" launch button 608 on the device management screen 600, then in step S2101, the device management 80 illustrated in FIG. 9 starts device management link launch processing. In step S2102, the device management control unit 902 of the device management 80 acquires information relating to the element 814 described in the control file 800 for device management via the device management control file reading unit 904.

In step S2103, the device management control unit 902 launches the print application 30 via the link execution unit 903 according to the information of the element 814 acquired in step S2102. An example of the processing for launching the print application 30 according to the present exemplary embodiment is described below in more detail with reference to a flowchart illustrated in FIG. 16.

If the print application 30 is launched, then in step S2104, the device management control unit 902 acquires a process ID of the application 30 launched in step S2102 via the launched application management unit 1501. In step S2105, the launched application management unit 1501 stores the process ID acquired in step S2104 and the device name associated with the device management screen 600 of the launching source in the launched application information storage unit 1502.

In the present exemplary embodiment, the launched application information storage unit 1502 stores the data in a registry of the OS. However, if the application/DDI interface 84 is readable, the storage destination of the launched application information storage unit 1502 can be the RAM 1201 or the HDD 1202. The following is example data of the launched application information, in which a process ID 2301 and a device name 2302 are stored as information relating to the launched application.

ProcessId: 01234567 . . . 2301
DeviceName: "ABC Kmmn" 2302
Namely, a numerical value stored as the process ID 2301 is "01234567", and a name stored as the device name 2302 is the name "ABC Kmmn" of the device 503.

Next, in step S2106, the launched application management unit 1501 acquires state-of-process information with respect to the print application 30. In step S2107, the launched application management unit 1501 determines whether the print application 30 is completed. If it is determined that the print application 30 is completed (YES in step S2107), then in step S2108, the launched application management unit 1501 discards the launched application information stored in step S2105.

Subsequently, in step S2109, the device management control unit 902 terminates the processing routine illustrated in FIG. 12. On the other hand, if it is determined that the print application 30 is not completed (NO in step S2107), the processing returns to step S2106 to repeat the above-described processing of step S2106 and step S2107.

Figure 16:
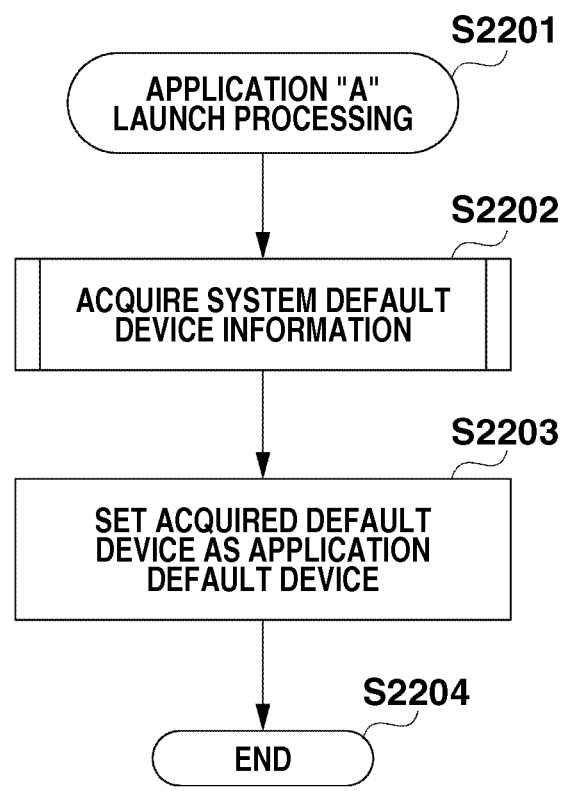
FIG. 16 is a flowchart illustrating an example of print application launch processing according to an exemplary embodiment of the present invention.

FIG. 16 is a flowchart illustrating an example of processing for launching the print application 30 when the print application 30 is launched in step S2103. A computer program relating to the flowchart illustrated in FIG. 16 is usually stored in the HDD 1202 and loaded into the RAM 1201 and can be executed by the CPU 1204 when the program is loaded into the RAM 1201 from the HDD 1202.

When the print application 30 is launched in step S2103, then in step S2201, the application control unit 907 starts launch processing illustrated in FIG. 16. In step S2202, the application control unit 907 executes system default device information acquisition processing (see FIG. 17) via the default device acquisition unit 1503. The application/DDI interface 84 executes the processing illustrated in FIG. 17.

In step S2203, the application control unit 907 sets the system default device acquired in step S2202 as a default device of the print application 30, via the default device setting unit 908. Then, in step S2204, the application control unit 907 terminates the processing routine illustrated in FIG. 16. The application default device information is stored in a memory area of the RAM 1201 that can be managed by the print application 30.

When the above-described launch processing for the print application 30 is completed, the screen 200 for the application "A" illustrated in FIG. 6A is displayed.

Figure 17:
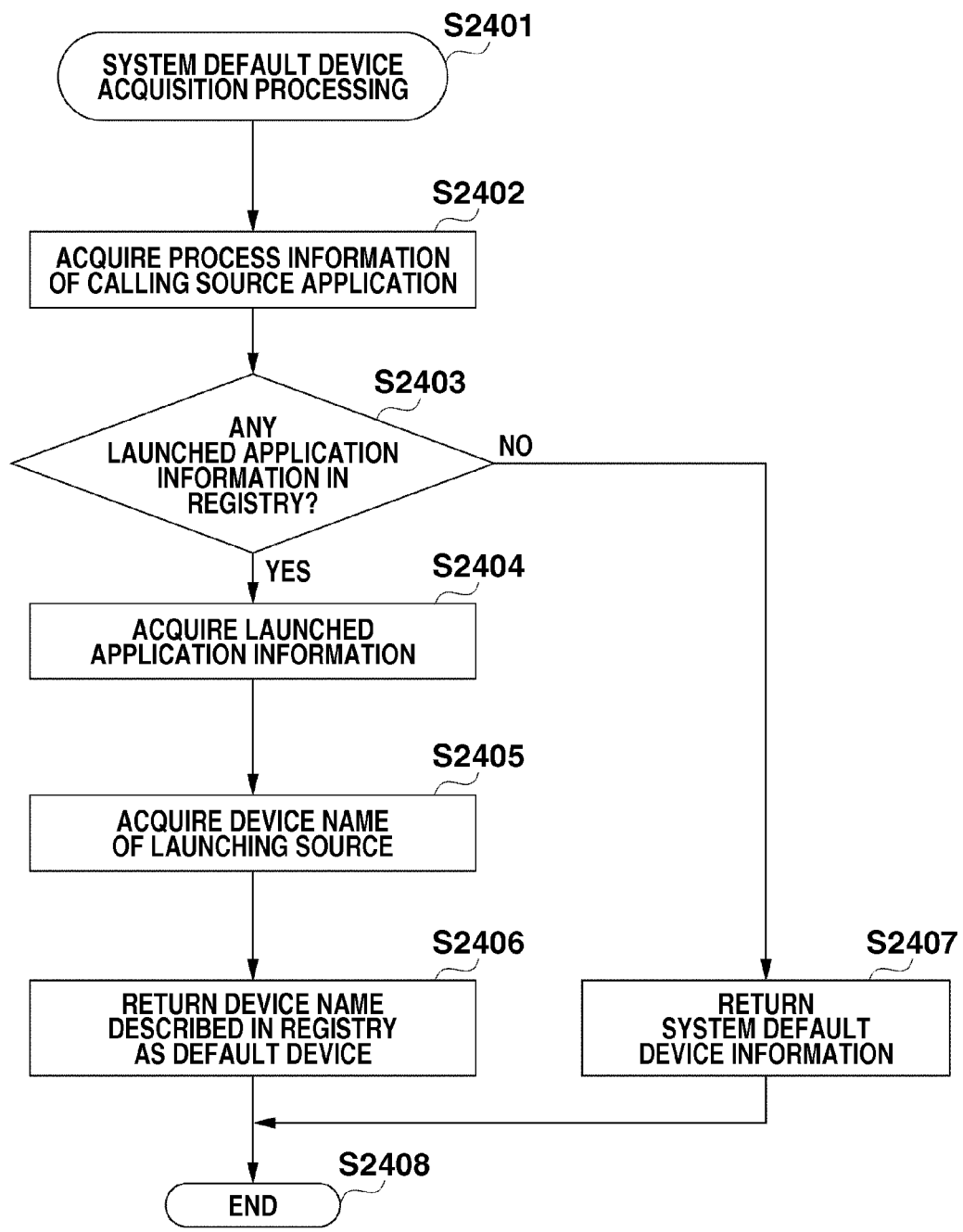
FIG. 17 is a flowchart illustrating an example of system default device acquisition processing according to an exemplary embodiment of the present invention.

FIG. 17 is a flowchart illustrating an example of system default device acquisition processing that can be performed by the application/DDI interface 84. A computer program relating to the flowchart illustrated in FIG. 17 is usually stored in the HDD 1202 and can be executed by the CPU 1204 when the program is loaded into the RAM 1201 from the HDD 1202.

If in step S2202 the default device acquisition unit 1503 calls a default device acquisition API that is opened by the application/DDI interface 84, then in step S2401, the application/DDI interface 84 starts the system default device acquisition processing illustrated in FIG. 17.

Next, in step S2402, the application/DDI interface 84 acquires process information of the print application 30 that is a calling source of the default device acquisition processing. In the present exemplary embodiment, the application/DDI interface 84 acquires "01234567" as process ID information of the print application 30. In step S2403, the application/DDI interface 84 determines whether any launched application information is present in the registry.

If it is determined that the launched application information is present (YES in step S2403), then in step S2404, the application/DDI interface 84 acquires the launched application information from the launched application information storage unit 1502. If the launched application information is present in the registry (YES instep S2403), the application/DDI interface 84 can determine that the print application 30 was launched from the device management screen 600.

According to the example illustrated in FIG. 8, the element 814 includes a description "/devmng" indicating that the print application 30 was launched from the device management screen 600. In the present exemplary embodiment, no specific description is required because the above-described determination is performed based on the launched application information.

Next, in step S2405, the application/DDI interface 84 acquires a device name that is associated with the device management screen 600 of the source that launched the print application 30 based on the launched application information acquired in step S2404. In the present exemplary embodiment, the application/DDI interface 84 acquires the name "ABC Kmmn" stored in the device name 2302.

In step S2406, the application/DDI interface 84 returns the device name "ABC Kmmn" acquired in step S2405 as default device information to the default device acquisition unit 1503 (i.e., the calling source) of the print application 30. Then, in step S2408, the application/DDI interface 84 terminates the processing routine illustrated in FIG. 17. On the other hand, if it is determined that the launched application information is not present in the registry (NO in step S2403), then in step S2407, the application/DDI interface 84 returns system default device information to the default device acquisition unit 1503 (i.e., the calling source) of the print application 30.

Then, in step S2408, the application/DDI interface 84 terminates the processing routine illustrated in FIG. 17. In the present exemplary embodiment, the application/DDI interface 84 returns the name "XYZ Defg" of the device 501 as system default device information because the device 501 is set as a default device in the "Devices and Printers" folder 500 illustrated in FIG. 5A.

If the file menu 201 is selected on the print application 30, the print menu 202 is displayed as illustrated in FIG. 6B. If the print menu 202 is selected from the file menu 201 illustrated in FIG. 6B, the application control unit 907 executes the print processing illustrated in FIG. 11. The print processing to be performed in the present exemplary embodiment is substantially the same as that of the first exemplary embodiment.

Through the above-described processing, the device associated with the device management screen is set and selected as a default device in a case where an arbitrary application is launched from the device management screen. Therefore, it is unnecessary to repeat the processing for selecting a device. As a result, the present exemplary embodiment can improve user operability.

Further, another exemplary embodiment is described below. According to the above-described exemplary embodiments, when the application "A" launch button 608 is pressed on the device management screen 600, the apparatus launches the application "A" while setting a device name so as to improve user operability. However, as an exemplary embodiment that is not related to the above-described application launch processing, an entry function of a configuration module of the printer driver 50 can be used to launch at least a part of the driver.

In the third element <dm:function> illustrated in FIG. 8, an element 809 indicating a description <dm:name xml:lang="en-US">Show Ink Level</dm:name> includes a character string "Show Ink Level" to be displayed on the ink remaining amount button 606. An element 810 indicating a description <dm:execute> includes a code "rundll32 StatusMonitor.dll, FunctionEntry DeviceFriendlyName;1;100" that is set to execute a function for displaying an ink remaining amount of the status monitor 39.

In the fourth element <dm:function> illustrated in FIG. 8, an element 811 indicating a description <dm:name xml:lang="en-US">Show Device Status</dm:name> includes a character string "Show Device Status" to be displayed on the device status button 607. An element 812 indicating a description <dm:execute> includes a code "rundll32 StatusMonitor.dll, FunctionEntry DeviceFriendlyName;2;100" that is set to execute a function for displaying a device status of the status monitor 39.

In this case, StatusMonitor.dll is a module of the status monitor 39, which is constituted by Dynamic Link Library of Windows OS, and can be shared among a plurality of devices. More specifically, StatusMonitor.dll is the module that can display state information (e.g., ink remaining amount, warning, and error) not only for the MFP 3 but also for other devices.

For example, an ink cartridge of four colors (e.g., cyan, magenta, yellow, and black) is mounted on the MFP 3. In this case, the status monitor 39 displays an ink remaining amount for each of the four color inks. On the other hand, an ink cartridge of six colors (e.g., cyan, magenta, yellow, black, photo cyan, and photo magenta) may be mounted on another MFP. In this case, the status monitor 39 displays an ink remaining amount for each of the six color inks.

In this case, to enable the status monitor 39 to correctly display the state information (e.g., ink remaining amount, warning, and error) according to the type of each device, it is necessary to identify the device using an appropriate method and perform an appropriate control for the identified device as described below in detail with reference to FIG. 20.

Figure 18:
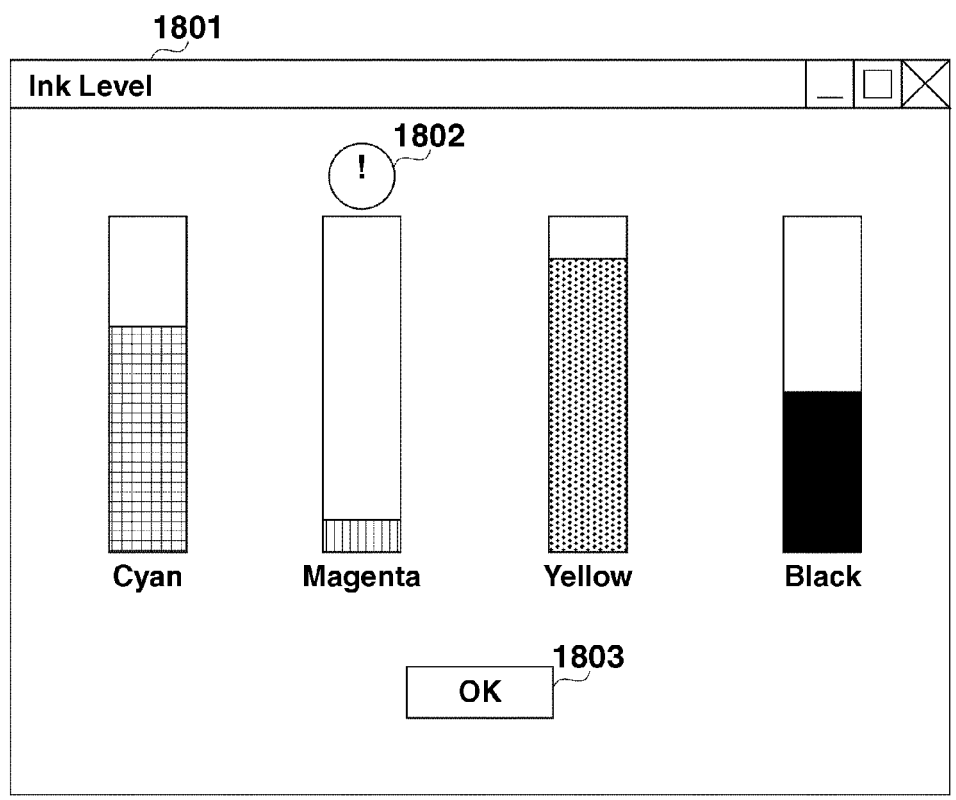
FIG. 18 illustrates an example of an ink remaining amount dialog according to an exemplary embodiment of the present invention.

FunctionEntry is a function that the status monitor 39 can export and has the following three arguments.
<First Argument>
DeviceName: an argument designating a device name
DeviceFriendlyName . . . a device name to be displayed as the device name 602 (friendly name)
<Second Argument>
ID: an argument designating a function
1 . . . display an ink remaining amount dialog 1801
2 . . . display device a status dialog 1901
<Third Argument>
Type: an argument designating a launching source
100 . . . device management
200 . . . application "A"
999 . . . others FIG. 18 illustrates an example of the ink remaining amount dialog 1801. The ink remaining amount dialog 1801 illustrated in FIG. 18 displays an ink remaining amount of each ink usable in the MFP 3. The MFP 3 uses four color inks of cyan, magenta, yellow, and black. Therefore, the ink remaining amount dialog 1801 displays four bar indications representing the remaining amount of four color inks.

In FIG. 18, a warning mark 1802 displayed on top of the remaining amount bar indicates that the corresponding color ink is in a warning level. If the warning mark 1802 is added to the remaining amount bar of the magenta ink, the magenta ink is running low. The same warning mark 1802 is displayed above or near any other remaining amount bar if the corresponding color ink is in a warning level. Although not illustrated in FIG. 18, an error mark can be also displayed when the ink remaining amount becomes zero. If an OK button 1803 is pressed, the ink remaining amount dialog 1801 is closed.

Figure 19:
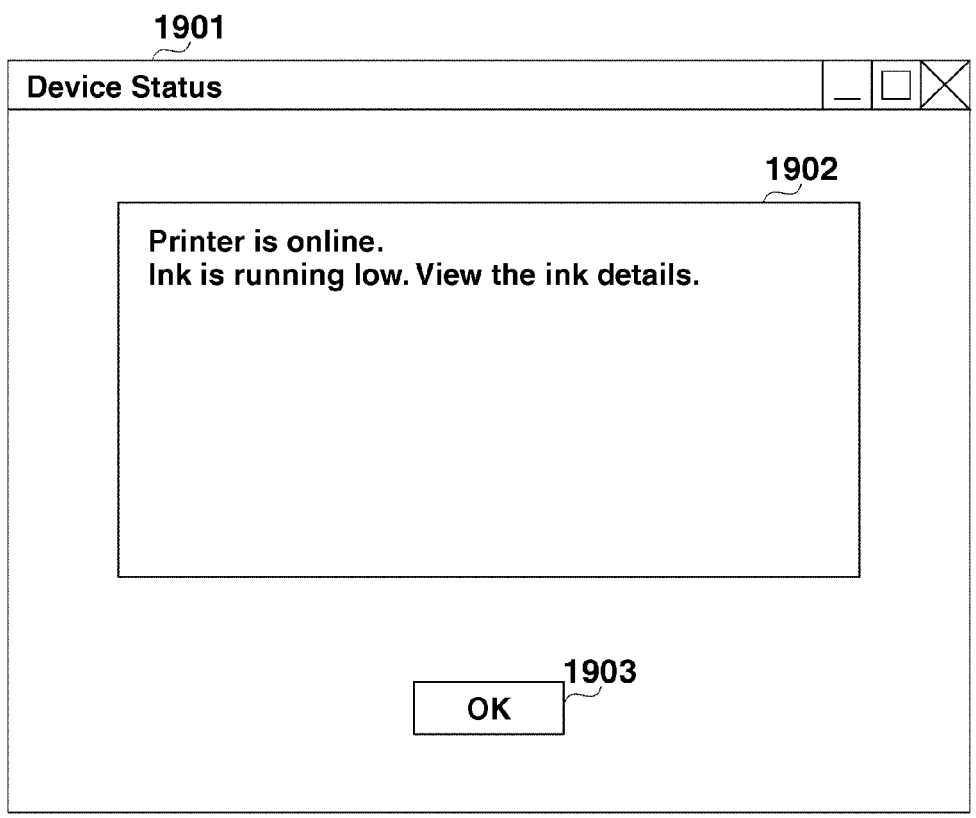
FIG. 19 illustrates an example of a device status dialog according to an exemplary embodiment of the present invention.

FIG. 19 illustrates an example of the device status dialog 1901. The device status dialog 1901 illustrated in FIG. 19 displays a device status (i.e., a present state of the device) of the MFP 3. The device status dialog 1901 includes a status display portion 1902 in which simple or detailed information indicating a device status of the MFP 3 is displayed. According to the example illustrated in FIG. 19, the MFP 3 is online and the ink is running low. The device status dialog 1901 further includes an OK button 1903. If the OK button 1903 is pressed, the device status dialog 1901 is closed.

Figure 20:
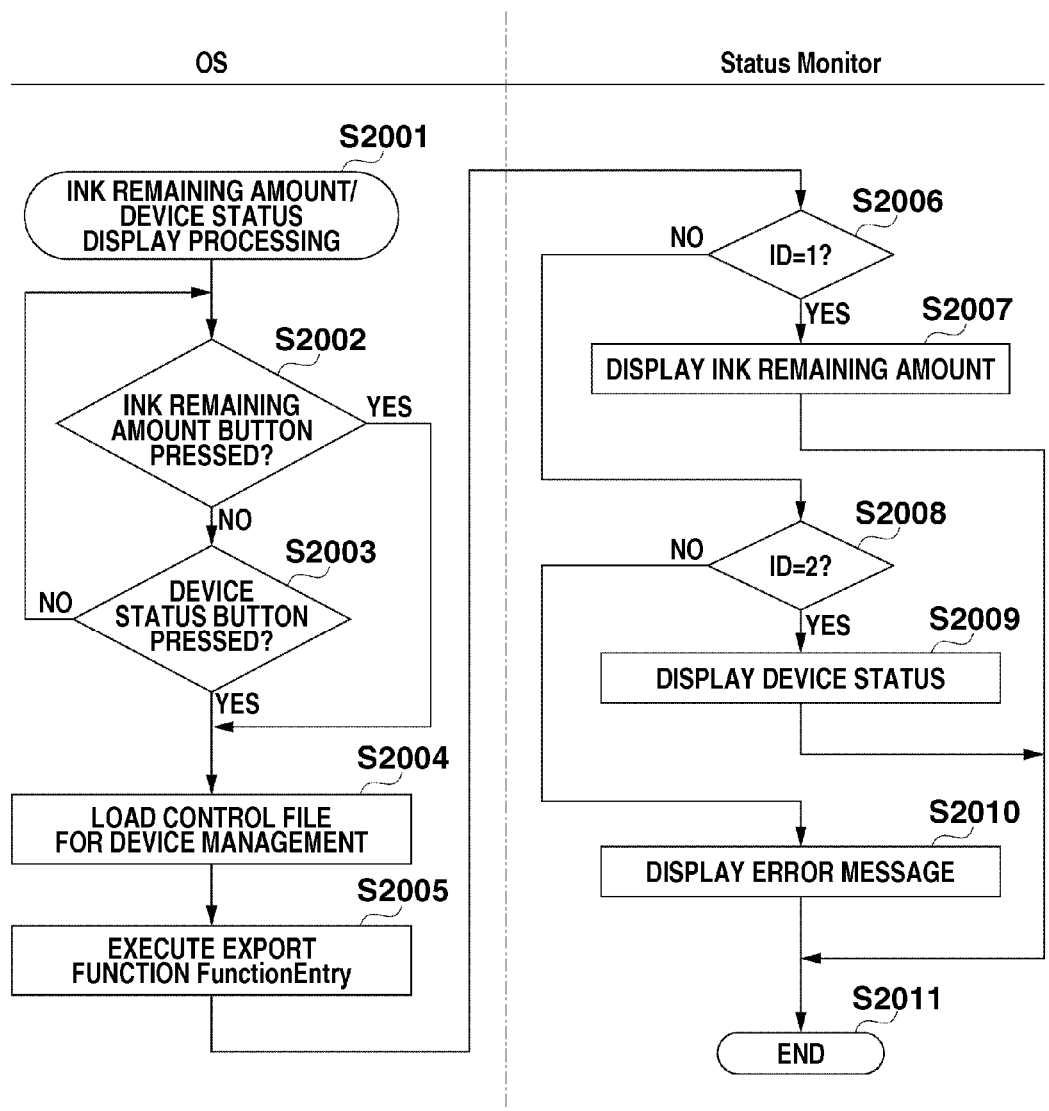
FIG. 20 is a flowchart illustrating an example of ink remaining amount/device status display processing according to an exemplary embodiment of the present invention.

FIG. 20 is a flowchart illustrating an example of ink remaining amount/device status display processing. A computer program relating to the flowchart illustrated in FIG. 20 is usually stored in the HDD 1202 and can be executed by the CPU 1204 when the program is loaded into the RAM 1201 from the HDD 1202. In FIG. 20, processing of steps S2001 to S2005 described in a left half is a control to be executed by the OS and processing of steps S2006 to S2011 described in a right half is a control to be executed by the status monitor 39.

If a user presses the ink remaining amount button 606 or the device status button 607 displayed on the device management screen 600, in step S2001, the device management 80 starts executing ink remaining amount/device status display processing illustrated in FIG. 20. Next, in step S2002, the device management control unit 902 determines whether the ink remaining amount button 606 is pressed.

If it is determined that the ink remaining amount button 606 is pressed (YES in step S2002), then in step S2004, the device management control unit 902 acquires the element 810 indicating a description <dm:execute> from the control file 800 for device management via the device management control file reading unit 904. Next, in step S2005, the device management control unit 902 loads a code "module StatusMonitor.dll" of the status monitor 39 via the link execution unit 903 and executes export function FunctionEntry.

On the other hand, if it is determined that the ink remaining amount button 606 is not pressed (NO in step S2002), then in step S2003, the device management control unit 902 determines whether the device status button 607 is pressed. If it is determined that the device status button 607 is pressed (YES in step S2003), then in step S2004, the device management control unit 902 acquires the element 812 indicating a description <dm:execute> from the control file 800 for device management via the device management control file reading unit 904.

Next, in step S2005, the device management control unit 902 loads the module "StatusMonitor.dll" of the status monitor 39 via the link execution unit 903 and executes the export function FunctionEntry. In step S2005, the device management control unit 902 executes the program according to the first argument, the second argument, and the third argument in the export function FunctionEntry in the module "StatusMonitor.dll" of the status monitor 39. DeviceFriendlyName is set in the argument (DeviceName) that designates a device name (i.e., the first argument).

Therefore, the OS that detected the above-described character string replaces the character string "DeviceFriendlyName" with a character string "ABC Kmmn" that indicates a device name (friendly name) of the MFP 3 and sends the replaced name information to the application. The application determines a printer name to be displayed based on the received information.

In step S2006, the status monitor 39 determines whether the argument (ID) designating the function (i.e., the second argument) is 1. If it is determined that the ID is equal to 1 (YES instep S2006), then in step S2007, the status monitor 39 displays the ink remaining amount dialog 1801 illustrated in FIG. 18. After the processing of step S2007 for displaying the ink remaining amount dialog 1801 is completed, then in step S2011, the status monitor 39 terminates the ink remaining amount/device status display processing routine illustrated in FIG. 20.

If it is determined that the argument (ID) designating the function (i.e., the second argument) is not 1 (NO in step S2006), then in step S2008, the status monitor 39 determines whether the ID is equal to 2. If it is determined that the ID is equal to 2 (YES in step S2008), then in step S2009, the status monitor 39 displays the device status dialog 1901 illustrated in FIG. 19. Then in step S2011, the status monitor 39 terminates the ink remaining amount/device status display processing routine illustrated in FIG. 20.

If it is determined that the argument (ID) designating the function (i.e., the second argument) is not equal to 2 (NO in step S2008), then in step S2010, the status monitor 39 displays an error message "designated function is unexecutable." Subsequently, in step S2011, the status monitor 39 terminates the ink remaining amount/device status display processing routine illustrated in FIG. 20.

In normal cases, the status monitor 39 does not display the error message. However, if the OS malfunctions due to some reasons, erroneous information may be designated as the argument (ID) designating the function (i.e., the second argument). In such a case, if the export function FunctionEntry is executed, the status monitor 39 displays the above-described error message. If it is determined that the device status button 607 is not pressed (NO in step S2003), the processing returns to step S2002 to repeat the above-described processing for confirming whether the ink remaining amount button 606 or the device status button 607 is pressed.

In the drawing, the argument (Type) representing the launching source (i.e., the third argument) is not referred to. However, it is useful to switch the dialog to be displayed according to the Type. For example, it may be desirable to differentiate the contents of the ink remaining amount dialog and the device status dialog for various cases, for example, in a case where the launch source is the device management, in a case where the launch source is the application "A", and in a case where the launch source is another application. The user operability can be improved by referring to the third argument and performing a control for switching the dialog to be displayed according to the third argument.

As described above, in executing the function for displaying the ink remaining amount dialog 1801 and the device status dialog 1901, which is incorporated in the status monitor 39 (i.e., a part of the configuration module of the printer driver 50) capable of displaying the state information (e.g., ink remaining amount, warning, and error) of a plurality of devices, the status monitor 39 can cause a designated device to execute each function by designating and executing the device name 602. Therefore, the ink remaining amount and the device status can be correctly displayed according to the type of each device. As a result, a peripheral apparatus control system excellent in operability can be realized.

The above-described final exemplary embodiment intends to correctly display an ink remaining amount and a device status for each target (designated) device. However, the present invention is not limited to the above-described embodiment. The present invention can be applied to an arbitrary function, for example, to accurately execute a function of a general driver for a target (designated) device.

An exemplary embodiment of the present exemplary embodiment is described below. The PC 1 is an example of an information processing apparatus that can communicate with a plurality of peripheral apparatus. Further, the device management 80 illustrated in FIG. 9 sets the printer 7 (i.e., an example of the predetermined peripheral apparatus) as a default control target peripheral apparatus of the PC 1. The default control target peripheral apparatus is a peripheral apparatus that is initially selected as a printer (scanner) frequently used by the operating system or an ordinary printer (scanner).

The display unit 901 causes the LCD 1205 to display the device management screen (see FIG. 5B) that corresponds to the MFP 3 (an example of another peripheral apparatus) other than the printer 7.

In response to an instruction entered via the device management screen corresponding to the MFP 3, the device management 80 launches and controls an application that is associated with the device management screen.

In synchronization with the launching of the application by the device management 80, identification information (e.g., printer friendly name) of the peripheral apparatus that corresponds to the device management screen is input to the application. Therefore, the MFP 3 can be selected as a control target peripheral apparatus other than the printer 7. The OS can acquire the printer friendly name according to the procedure described in FIG. 8.

In response to an instruction entered via an instruction unit (see 608 in FIG. 5B) that instructs launching an application on the device management screen, identification information (e.g., printer friendly name) of a peripheral apparatus, which is described in association with the application, in a control file for device management (i.e., an example of setting data of the device management screen) can be input to the application when the application is launched.

The application may further include the status acquisition unit 910 that acquires status information of the MFP 3. Further, if the status acquisition unit 910 acquires information indicating that the peripheral apparatus is unusable (error, paper jam, power source, etc.), the device management 80 does not select the MFP 3 and select the printer 7 that was preliminarily set as a system default device.

The device management 80 may determine whether the application launching source is the device management screen. In this case, if the device management 80 determines that the launching source is the device management screen, the above-described processing for selecting the MFP 3 is performed. If the device management 80 determines that the launching source is not the device management screen, the printer 7 (i.e., the system default device) can be set as a control target peripheral apparatus.

In a case where an action for launching an application on a device management screen is made and execution of the action is instructed, to enable the application to select an appropriate printer, the device management 80 of the PC 1 sets setting data (i.e., data for customizing the device management screen) describing identification information (e.g., printer friendly name) of a peripheral apparatus to be input to the application in a predetermined area of the operating system. The peripheral apparatus includes at least part or all of MFP, printer, scanner, copying machine, and digital camera.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-158939 filed Jul. 3, 2009, which is hereby incorporated by reference herein in its entirety.

What is claimed is:

1. An information processing apparatus comprising:
a launching unit configured to, in a case where a launching button on a device management screen associated with a predetermined device is pressed, designate identification information of the predetermined device as an argument of an application and launch the application, wherein the device management screen is displayed based on a file for device management control and the file for device management control is installed in response to an installation of a printer driver;

a setting unit configured to, in a case where the application has been launched by the launching unit, set the predetermined device associated with the device management screen as a default device of the application; and a display unit configured to display a selection screen of the application for selecting a device such that the default device is selected on the screen.

2. The information processing apparatus according to claim 1, wherein the device is a printing device.

3. The information processing apparatus according to claim 1, further comprising:

a determination unit configured to determine whether the predetermined device is usable or not, wherein the setting unit sets the predetermined device as a default device on the selection screen of the application, in a case where the application has been launched from the device management screen and the determination unit determines that the predetermined device is usable.

4. The information processing apparatus according to claim 1, wherein the setting unit sets a default device registered in a system as the default device on the selection screen of the application in a case where the application has been launched not from the device management screen.

5. An information processing method comprising:

designating, in a case where a launching button on a device management screen associated with a predetermined device is pressed, identification information of the predetermined device as an argument of an application and launch the application, wherein the device management screen is displayed based on a file for device management control and the file for device management control is installed in response to an installation of a printer driver;

setting, in a case where the application has been launched by the launching, the predetermined device associated with the device management screen as a default device of the application; and displaying a selection screen of the application for selecting a device such that the default device is selected on the screen.

6. The information processing method according to claim 5, wherein the device is a printing device.

7. The information processing method according to claim 5, further comprising:

determining whether the predetermined device is usable or not, wherein the setting sets the predetermined device as a default device on the selection screen of the application, in a case where the application has been launched from the device management screen and the determining determines that the predetermined device is usable.

8. The information processing method according to claim 5, wherein the setting sets a default device registered in a system as the default device on the selection screen of the application in a case where the application has been launched not from the device management screen.

9. A non-transitory computer readable storage medium storing a computer-executable program of instructions for causing a computer to perform an information processing method comprising:

designating, in a case where a launching button on a device management screen associated with a predetermined device is pressed, identification information of the predetermined device as an argument of an application and launch the application, wherein the device management screen is displayed based on a file for device management control and the file for device management control is installed in response to an installation of a printer driver;

setting, in a case where the application has been launched by the launching, the predetermined device associated with the device management screen as a default device of the application; and displaying a selection screen of the application for selecting a device such that the default device is selected on the screen.

10. The non-transitory computer readable storage medium according to claim 9, wherein the device is a printing device.

11. The non-transitory computer readable storage medium according to claim 9, further comprising:

determining whether the predetermined device is usable or not, wherein the setting sets the predetermined device as a default device on the selection screen of the application, in a case where the application has been launched from the device management screen and the determining determines that the predetermined device is usable.

12. The non-transitory computer readable storage medium according to claim 9, wherein the setting sets a default device registered in a system as the default device on the selection screen of the application in a case where the application has been launched not from the device management screen.

* * * * *